United States Patent
Turgeman et al.

(10) Patent No.: US 10,834,590 B2
(45) Date of Patent: Nov. 10, 2020

(54) METHOD, DEVICE, AND SYSTEM OF DIFFERENTIATING BETWEEN A CYBER-ATTACKER AND A LEGITIMATE USER

(71) Applicant: BioCatch Ltd., Tel Aviv (IL)

(72) Inventors: Avi Turgeman, Cambridge, MA (US); Oren Kedem, Tel Aviv (IL); Uri Rivner, Mazkeret Batya (IL)

(73) Assignee: BIOCATCH LTD., Tel Aviv (IL)

(*) Notice: Subject to any disclaimer, the term of this patent is extended or adjusted under 35 U.S.C. 154(b) by 57 days.

(21) Appl. No.: 15/885,819

(22) Filed: Feb. 1, 2018

(65) Prior Publication Data

US 2018/0160309 A1    Jun. 7, 2018

Related U.S. Application Data

(63) Continuation-in-part of application No. 14/675,764, filed on Apr. 1, 2015, now abandoned, which is a
(Continued)

(51) Int. Cl.
*H04W 12/06* (2009.01)
*G06F 21/55* (2013.01)
(Continued)

(52) U.S. Cl.
CPC ............ *H04W 12/06* (2013.01); *G06F 3/041* (2013.01); *G06F 21/31* (2013.01); *G06F 21/316* (2013.01);
(Continued)

(58) Field of Classification Search
CPC ........ H04W 12/06; G06F 3/041; G06F 21/31; G06F 21/32; G06F 21/316; G06F 21/554;
(Continued)

(56) References Cited

U.S. PATENT DOCUMENTS 3,618,019 A    11/1971    Nemirovsky
3,699,517 A    10/1972    Dyche
(Continued)

FOREIGN PATENT DOCUMENTS

EP    2410450        1/2012
EP    2410450 A1    1/2012
(Continued)

OTHER PUBLICATIONS

Stinson et al., "Characterizing Bots' Remote Control Behavior". Detection of Intrusions and Malware, and Vulnerability Assessment. Springer Berlin Heidelberg, p. 89-108. Dec. 31, 2007.
(Continued)

*Primary Examiner* — Alexander Lagor
*Assistant Examiner* — William B Jones
(74) *Attorney, Agent, or Firm* — Eitan Mehulal Sadot

(57) ABSTRACT

Devices, systems, and methods of detecting user identity, differentiating between users of a computerized service, and detecting a cyber-attacker. A user utilizes a desktop computer, a laptop computer, a smartphone, a tablet, or other electronic device, to interact with a banking website or application, a retailer website or application, or other computerized service. Input-unit interactions are monitored, logged, and analyzed. Based on several types of analysis of the input-unit interactions, a score is generated to reflect fraud-relatedness or attack-relatedness of the input-unit interactions. Based on the score, the system estimates or determines whether the user is an attacker, and initiates attach-mitigation operations or fraud-mitigation operations.

7 Claims, 6 Drawing Sheets

Related U.S. Application Data continuation-in-part of application No. 14/566,723, filed on Dec. 11, 2014, now Pat. No. 9,071,969, which is a continuation of application No. 13/922,271, filed on Jun. 20, 2013, now Pat. No. 8,938,787, which is a continuation-in-part of application No. 13/877,676, filed as application No. PCT/IL2011/000907 on Nov. 29, 2011, now Pat. No. 9,069,942, said application No. 14/675,764 is a continuation-in-part of application No. 14/320,653, filed on Jul. 1, 2014, now Pat. No. 9,275,337, and a continuation-in-part of application No. 14/320,656, filed on Jul. 1, 2014, now Pat. No. 9,665,703, and a continuation-in-part of application No. 14/325,393, filed on Jul. 8, 2014, now Pat. No. 9,531,733, and a continuation-in-part of application No. 14/325,394, filed on Jul. 8, 2014, now Pat. No. 9,547,766, and a continuation-in-part of application No. 14/325,395, filed on Jul. 8, 2014, now Pat. No. 9,621,567, and a continuation-in-part of application No. 14/325,396, filed on Jul. 8, 2014, now abandoned, and a continuation-in-part of application No. 14/325,397, filed on Jul. 8, 2014, now Pat. No. 9,450,971, and a continuation-in-part of application No. 14/325,398, filed on Jul. 8, 2014, now Pat. No. 9,477,826.

(60) Provisional application No. 61/973,855, filed on Apr. 2, 2014, provisional application No. 61/417,479, filed on Nov. 29, 2010, provisional application No. 61/843,915, filed on Jul. 9, 2013.

(51) Int. Cl.
*G06F 21/31* (2013.01)
*G06F 3/041* (2006.01)
*H04M 1/725* (2006.01)
*G06F 21/83* (2013.01)
*H04L 29/06* (2006.01)
*G06F 21/32* (2013.01)

(52) U.S. Cl.
CPC ............ *G06F 21/554* (2013.01); *G06F 21/83* (2013.01); *H04L 63/0861* (2013.01); *H04M 1/72522* (2013.01); *G06F 21/32* (2013.01)

(58) Field of Classification Search
CPC . G06F 21/83; H04L 63/0861; H04N 1/00854; H04M 1/72522
See application file for complete search history.

(56) References Cited

U.S. PATENT DOCUMENTS

| | | | |
|---|---|---|---|
| 3,983,535 A | 9/1976 | Herbst | |
| 4,128,829 A | 12/1978 | Herbst | |
| 4,621,334 A | 11/1986 | Garcia | |
| 4,760,386 A | 7/1988 | Heath | |
| 4,805,222 A | 2/1989 | Young | |
| 5,305,238 A | 4/1994 | Starr | |
| 5,442,342 A | 8/1995 | Kung | |
| 5,485,171 A | 1/1996 | Copper | |
| 5,557,686 A | 9/1996 | Brown | |
| 5,565,657 A | 10/1996 | Merz | |
| 5,581,261 A | 12/1996 | Hickman | |
| 5,838,306 A | 11/1998 | O'Connor | |
| 5,874,941 A | 2/1999 | Yamada | |
| 5,999,162 A | 12/1999 | Takahashi | |
| 6,202,023 B1 | 3/2001 | Hancock | |
| 6,337,686 B2 | 1/2002 | Wong | |
| 6,337,919 B1 | 1/2002 | Dunton | |
| 6,442,692 B1 | 8/2002 | Zilberman | |
| 6,572,014 B1 | 6/2003 | Lambert | |
| 6,819,219 B1 | 11/2004 | Bolle | |
| 6,836,554 B1 | 12/2004 | Bolle | |
| 6,895,514 B1 | 5/2005 | Kermani | |
| 6,931,131 B1 | 8/2005 | Becker | |
| 6,938,061 B1 | 8/2005 | Rumynin | |
| 6,938,159 B1 | 8/2005 | O'Connor | |
| 6,957,185 B1 | 10/2005 | Labaton | |
| 6,957,186 B1 | 10/2005 | Guheen | |
| 6,983,061 B2 | 1/2006 | Ikegami | |
| 7,092,926 B2 | 8/2006 | Cerrato | |
| 7,130,452 B2 | 10/2006 | Bolle | |
| 7,133,792 B2 | 11/2006 | Murakami | |
| 7,139,916 B2 | 11/2006 | Billingsley | |
| 7,158,118 B2 | 1/2007 | Liberty | |
| 7,236,156 B2 | 6/2007 | Liberty | |
| 7,245,218 B2 | 7/2007 | Ikehara | |
| 7,366,919 B1 | 4/2008 | Sobel | |
| 7,395,436 B1 | 7/2008 | Nemovicher | |
| 7,494,061 B2 | 2/2009 | Reinhold | |
| 7,523,191 B1 | 4/2009 | Thomas | |
| 7,535,456 B2 | 5/2009 | Liberty | |
| 7,606,915 B1 | 10/2009 | Calinov | |
| 7,796,013 B2 | 9/2010 | Murakami | |
| 7,818,290 B2 | 10/2010 | Davis | |
| 7,860,870 B2 | 12/2010 | Sadagopan | |
| 8,031,175 B2 | 10/2011 | Rigazio | |
| 8,065,624 B2 | 11/2011 | Morin | |
| 8,125,312 B2 | 2/2012 | Orr | |
| 8,156,324 B1 | 4/2012 | Shnowske | |
| 8,201,222 B2 | 6/2012 | Inoue | |
| 8,285,658 B1 | 10/2012 | Kellas-Dicks | |
| 8,417,960 B2 | 4/2013 | Takahashi | |
| 8,433,785 B2 | 4/2013 | Awadallah | |
| 8,449,393 B2 | 5/2013 | Sobel | |
| 8,499,245 B1 | 7/2013 | Froment | |
| 8,510,113 B1 | 8/2013 | Conkie | |
| 8,548,208 B2 | 10/2013 | Schultz | |
| 8,549,629 B1 * | 10/2013 | McCreesh | G06F 21/316 726/22 |
| 8,555,077 B2 | 10/2013 | Davis | |
| 8,745,729 B2 | 6/2014 | Poluri | |
| 8,788,838 B1 | 8/2014 | Fadell | |
| 8,803,797 B2 | 8/2014 | Scott | |
| 8,819,812 B1 | 8/2014 | Weber | |
| 8,832,823 B2 | 9/2014 | Boss | |
| 8,838,060 B2 | 9/2014 | Walley | |
| 8,880,441 B1 | 11/2014 | Chen | |
| 8,898,787 B2 | 11/2014 | Thompson | |
| 8,938,787 B2 | 1/2015 | Turgeman | |
| 8,941,466 B2 | 1/2015 | Bayram | |
| 8,990,959 B2 | 3/2015 | Zhu | |
| 9,069,942 B2 | 6/2015 | Turgeman | |
| 9,071,969 B2 | 6/2015 | Turgeman | |
| 9,154,534 B1 | 10/2015 | Gayles | |
| 9,174,123 B2 | 11/2015 | Nasiri | |
| 9,195,351 B1 | 11/2015 | Rosenberg | |
| 9,275,337 B2 | 3/2016 | Turgeman | |
| 9,282,112 B2 | 3/2016 | Filatov | |
| 9,301,140 B1 | 3/2016 | Costigan | |
| 9,304,915 B2 | 4/2016 | Adams | |
| 9,418,221 B2 | 8/2016 | Turgeman | |
| 9,450,971 B2 | 9/2016 | Turgeman | |
| 9,477,826 B2 | 10/2016 | Turgeman | |
| 9,483,292 B2 | 11/2016 | Turgeman | |
| 9,526,006 B2 | 12/2016 | Turgeman | |
| 9,529,987 B2 | 12/2016 | Deutschmann | |
| 9,531,701 B2 | 12/2016 | Turgeman | |
| 9,531,733 B2 | 12/2016 | Turgeman | |
| 9,536,071 B2 | 1/2017 | Turgeman | |
| 9,541,995 B2 | 1/2017 | Turgeman | |
| 9,547,766 B2 | 1/2017 | Turgeman | |
| 9,552,470 B2 | 1/2017 | Turgeman | |
| 9,558,339 B2 | 1/2017 | Turgeman | |
| 9,589,120 B2 | 3/2017 | Samuel | |
| 9,621,567 B2 | 4/2017 | Turgeman | |
| 9,626,677 B2 | 4/2017 | Turgeman | |
| 9,654,485 B1 * | 5/2017 | Neumann | H04L 63/1441 |
| 9,665,703 B2 | 5/2017 | Turgeman | |

(56) References Cited

U.S. PATENT DOCUMENTS

| | | |
|---|---|---|
| 9,674,218 B2 | 6/2017 | Turgeman |
| 9,690,915 B2 | 6/2017 | Turgeman |
| 9,703,953 B2 | 7/2017 | Turgeman |
| 9,710,316 B1 | 7/2017 | Chheda |
| 9,712,558 B2 | 7/2017 | Turgeman |
| 9,747,436 B2 | 8/2017 | Turgeman |
| 9,779,423 B2 | 10/2017 | Turgeman |
| 9,838,373 B2 | 12/2017 | Turgeman |
| 9,848,009 B2 | 12/2017 | Turgeman |
| 9,927,883 B1 | 3/2018 | Lin |
| 10,032,010 B2 | 7/2018 | Turgeman |
| 10,037,421 B2 | 7/2018 | Turgeman |
| 10,049,209 B2 | 8/2018 | Turgeman |
| 10,055,560 B2 | 8/2018 | Turgeman |
| 10,069,837 B2 | 9/2018 | Turgeman |
| 10,069,852 B2 | 9/2018 | Turgeman |
| 10,079,853 B2 | 9/2018 | Turgeman |
| 10,083,439 B2 | 9/2018 | Turgeman |
| 10,164,985 B2 | 12/2018 | Turgeman |
| 10,198,122 B2 | 2/2019 | Turgeman |
| 10,262,324 B2 | 4/2019 | Turgeman |
| 10,298,614 B2 | 5/2019 | Turgeman |
| 10,395,018 B2 | 8/2019 | Turgeman |
| 10,397,262 B2 | 8/2019 | Karabchevsky |
| 10,404,729 B2 | 9/2019 | Turgeman |
| 10,474,815 B2 | 11/2019 | Turgeman |
| 10,476,873 B2 | 11/2019 | Turgeman |
| 10,523,680 B2 | 12/2019 | Turgeman |
| 2001/0004733 A1 | 6/2001 | Eldering |
| 2002/0023229 A1 | 2/2002 | Hangai |
| 2002/0089412 A1 | 7/2002 | Heger |
| 2003/0033526 A1 | 2/2003 | French |
| 2003/0074201 A1 | 4/2003 | Grashey |
| 2003/0137494 A1 | 7/2003 | Tulbert |
| 2003/0212811 A1 | 11/2003 | Thornton |
| 2004/0015714 A1 | 1/2004 | Abraham |
| 2004/0017355 A1 | 1/2004 | Shim |
| 2004/0021643 A1 | 2/2004 | Hoshino |
| 2004/0034784 A1 | 2/2004 | Fedronic |
| 2004/0062423 A1 | 4/2004 | Doi |
| 2004/0111523 A1 | 6/2004 | Hall |
| 2004/0123156 A1 | 6/2004 | Hammond |
| 2004/0143737 A1 | 7/2004 | Teicher |
| 2004/0186882 A1 | 9/2004 | Ting |
| 2004/0187037 A1* | 9/2004 | Checco .................. G06F 21/32 726/7 |
| 2004/0221171 A1 | 11/2004 | Ahmed |
| 2005/0008148 A1 | 1/2005 | Jacobson |
| 2005/0060138 A1 | 3/2005 | Wang |
| 2005/0179657 A1 | 8/2005 | Russo |
| 2005/0289264 A1 | 12/2005 | Illowsky |
| 2006/0006803 A1 | 1/2006 | Huang |
| 2006/0080263 A1 | 4/2006 | Willis |
| 2006/0090073 A1 | 4/2006 | Steinberg |
| 2006/0123101 A1 | 6/2006 | Buccella |
| 2006/0143454 A1 | 6/2006 | Walmsley |
| 2006/0195328 A1 | 8/2006 | Abraham |
| 2006/0215886 A1 | 9/2006 | Black |
| 2006/0224898 A1 | 10/2006 | Ahmed |
| 2006/0280339 A1* | 12/2006 | Cho .......................... G07C 9/37 382/115 |
| 2006/0282660 A1 | 12/2006 | Varghese |
| 2006/0284969 A1 | 12/2006 | Kim |
| 2007/0118804 A1 | 5/2007 | Raciborski |
| 2007/0156443 A1 | 7/2007 | Gurvey |
| 2007/0174082 A1 | 7/2007 | Singh |
| 2007/0183633 A1 | 8/2007 | Hoffmann |
| 2007/0214426 A1 | 9/2007 | Ruelle |
| 2007/0226797 A1 | 9/2007 | Thompson |
| 2007/0236330 A1 | 10/2007 | Cho |
| 2007/0240230 A1 | 10/2007 | O'Connell |
| 2007/0250920 A1 | 10/2007 | Lindsay |
| 2007/0255821 A1 | 11/2007 | Ge |
| 2007/0266305 A1 | 11/2007 | Cong |
| 2007/0271466 A1 | 11/2007 | Mak |
| 2007/0283416 A1 | 12/2007 | Renaud |
| 2008/0046982 A1 | 2/2008 | Parkinson |
| 2008/0059474 A1 | 3/2008 | Lim |
| 2008/0068343 A1 | 3/2008 | Hoshino |
| 2008/0084972 A1 | 4/2008 | Burke |
| 2008/0091639 A1 | 4/2008 | Davis |
| 2008/0092209 A1 | 4/2008 | Davis |
| 2008/0092245 A1 | 4/2008 | Alward |
| 2008/0097851 A1 | 4/2008 | Bemmel |
| 2008/0098456 A1 | 4/2008 | Alward |
| 2008/0120717 A1 | 5/2008 | Shakkarwar |
| 2008/0136790 A1 | 6/2008 | Hio |
| 2008/0162449 A1 | 7/2008 | Chao-Yu |
| 2008/0183745 A1 | 7/2008 | Cancel |
| 2008/0192005 A1 | 8/2008 | Elgoyhen |
| 2008/0200310 A1 | 8/2008 | Tagliabue |
| 2008/0211766 A1 | 9/2008 | Westerman |
| 2008/0215576 A1 | 9/2008 | Zhao |
| 2008/0263636 A1 | 10/2008 | Gusler |
| 2008/0298588 A1 | 12/2008 | Shakkarwar |
| 2008/0301808 A1 | 12/2008 | Calo |
| 2008/0306897 A1 | 12/2008 | Liu |
| 2009/0037983 A1 | 2/2009 | Chiruvolu |
| 2009/0038010 A1 | 2/2009 | Ma |
| 2009/0089879 A1 | 4/2009 | Wang |
| 2009/0094311 A1 | 4/2009 | Awadallah |
| 2009/0132395 A1 | 5/2009 | Lam |
| 2009/0157792 A1 | 6/2009 | Fiatal |
| 2009/0172551 A1 | 7/2009 | Kane |
| 2009/0189736 A1 | 7/2009 | Hayashi |
| 2009/0199296 A1 | 8/2009 | Xie |
| 2009/0227232 A1 | 9/2009 | Matas |
| 2009/0241188 A1 | 9/2009 | Komura |
| 2009/0254336 A1 | 10/2009 | Dumais |
| 2009/0281979 A1 | 11/2009 | Tysowski |
| 2009/0293119 A1 | 11/2009 | Jonsson |
| 2009/0303204 A1 | 12/2009 | Nasiri |
| 2009/0320123 A1 | 12/2009 | Yu |
| 2010/0007632 A1 | 1/2010 | Yamazaki |
| 2010/0040293 A1 | 2/2010 | Hermann |
| 2010/0042387 A1 | 2/2010 | Gibbon |
| 2010/0042403 A1 | 2/2010 | Chandrasekar |
| 2010/0046806 A1 | 2/2010 | Baughman |
| 2010/0070405 A1 | 3/2010 | Joa |
| 2010/0077470 A1 | 3/2010 | Kozat |
| 2010/0082747 A1 | 4/2010 | Yue |
| 2010/0082998 A1 | 4/2010 | Kohavi |
| 2010/0115610 A1 | 5/2010 | Tredoux |
| 2010/0122082 A1 | 5/2010 | Deng |
| 2010/0125816 A1 | 5/2010 | Bezos |
| 2010/0138370 A1 | 6/2010 | Wu |
| 2010/0164897 A1 | 7/2010 | Morin |
| 2010/0171753 A1 | 7/2010 | Kwon |
| 2010/0197352 A1 | 8/2010 | Runstedler |
| 2010/0225443 A1 | 9/2010 | Bayram |
| 2010/0269165 A1 | 10/2010 | Chen |
| 2010/0281539 A1 | 11/2010 | Burns |
| 2010/0284532 A1 | 11/2010 | Burnett |
| 2010/0287229 A1 | 11/2010 | Hauser |
| 2010/0321304 A1 | 12/2010 | Rofougaran |
| 2010/0328074 A1 | 12/2010 | Johnson |
| 2011/0010209 A1 | 1/2011 | McNally |
| 2011/0012829 A1 | 1/2011 | Yao |
| 2011/0016320 A1 | 1/2011 | Bergsten |
| 2011/0016534 A1 | 1/2011 | Jakobsson |
| 2011/0018828 A1 | 1/2011 | Wu |
| 2011/0023115 A1 | 1/2011 | Wright |
| 2011/0029902 A1 | 2/2011 | Bailey |
| 2011/0039529 A1 | 2/2011 | Kim |
| 2011/0039602 A1 | 2/2011 | McNamara |
| 2011/0043475 A1 | 2/2011 | Rigazio |
| 2011/0050394 A1 | 3/2011 | Zhang |
| 2011/0063211 A1 | 3/2011 | Hoerl |
| 2011/0065504 A1 | 3/2011 | Dugan |
| 2011/0102570 A1 | 5/2011 | Wilf |
| 2011/0105859 A1 | 5/2011 | Popovic |
| 2011/0113388 A1 | 5/2011 | Eisen |
| 2011/0138454 A1* | 6/2011 | Mansour ................ H04L 9/3218 726/9 |

(56) References Cited

U.S. PATENT DOCUMENTS

| | | |
|---|---|---|
| 2011/0154273 A1 | 6/2011 | Aburada |
| 2011/0159650 A1 | 6/2011 | Shiraishi |
| 2011/0159850 A1 | 6/2011 | Faith |
| 2011/0162076 A1 | 6/2011 | Song |
| 2011/0191820 A1 | 8/2011 | Ivey |
| 2011/0193737 A1 | 8/2011 | Chiueh |
| 2011/0202453 A1 | 8/2011 | Issa |
| 2011/0221684 A1 | 9/2011 | Rydenhag |
| 2011/0223888 A1 | 9/2011 | Esaki |
| 2011/0225644 A1 | 9/2011 | Pullikottil |
| 2011/0246902 A1 | 10/2011 | Tsai |
| 2011/0248941 A1 | 10/2011 | Abdo |
| 2011/0251823 A1 | 10/2011 | Davis |
| 2011/0271342 A1 | 11/2011 | Chung |
| 2011/0276414 A1 | 11/2011 | Subbarao |
| 2011/0304531 A1 | 12/2011 | Brooks |
| 2011/0320822 A1 | 12/2011 | Lind |
| 2012/0005483 A1 | 1/2012 | Patvarczki |
| 2012/0005719 A1 | 1/2012 | McDougal |
| 2012/0007821 A1 | 1/2012 | Zaliva |
| 2012/0054834 A1 | 3/2012 | King |
| 2012/0096555 A1 | 4/2012 | Mahaffey |
| 2012/0102551 A1 | 4/2012 | Bidare |
| 2012/0113061 A1 | 5/2012 | Ikeda |
| 2012/0124662 A1 | 5/2012 | Baca |
| 2012/0133055 A1 | 5/2012 | Machida |
| 2012/0151559 A1 | 6/2012 | Koudys |
| 2012/0154173 A1 | 6/2012 | Chang |
| 2012/0154273 A1 | 6/2012 | McDade |
| 2012/0154823 A1 | 6/2012 | Sakamoto |
| 2012/0158503 A1 | 6/2012 | Mardikar |
| 2012/0159599 A1 | 6/2012 | Szoke |
| 2012/0164978 A1 | 6/2012 | Conti |
| 2012/0167170 A1 | 6/2012 | Shi |
| 2012/0167204 A1 | 6/2012 | Akka |
| 2012/0174213 A1 | 7/2012 | Geiger |
| 2012/0188198 A1 | 7/2012 | Jeong |
| 2012/0204257 A1 | 8/2012 | O'Connell |
| 2012/0218193 A1 | 8/2012 | Weber |
| 2012/0246737 A1 | 9/2012 | Paxton |
| 2012/0252410 A1 | 10/2012 | Williams |
| 2012/0278804 A1 | 11/2012 | Narayanasamy |
| 2012/0284380 A1 | 11/2012 | Anderson |
| 2013/0024239 A1 | 1/2013 | Baker |
| 2013/0036416 A1 | 2/2013 | Raju |
| 2013/0076650 A1 | 3/2013 | Vik |
| 2013/0088434 A1 | 4/2013 | Masuda |
| 2013/0097682 A1 | 4/2013 | Zeljkovic |
| 2013/0097706 A1 | 4/2013 | Titonis |
| 2013/0111586 A1 | 5/2013 | Jackson |
| 2013/0133055 A1 | 5/2013 | Ali |
| 2013/0135218 A1 | 5/2013 | Jain |
| 2013/0139248 A1 | 5/2013 | Rhee |
| 2013/0154999 A1 | 6/2013 | Guard |
| 2013/0162603 A1 | 6/2013 | Peng |
| 2013/0167212 A1 | 6/2013 | Azar |
| 2013/0212674 A1 | 8/2013 | Boger |
| 2013/0239195 A1 | 9/2013 | Turgeman |
| 2013/0239206 A1 | 9/2013 | Draluk |
| 2013/0254642 A1 | 9/2013 | Seo |
| 2013/0282637 A1 | 10/2013 | Costigan |
| 2013/0288647 A1 | 10/2013 | Turgeman |
| 2013/0305357 A1 | 11/2013 | Ayyagari |
| 2013/0312097 A1 | 11/2013 | Turnbull |
| 2013/0335349 A1 | 12/2013 | Ferren |
| 2014/0033317 A1 | 1/2014 | Barber |
| 2014/0041020 A1 | 2/2014 | Zhao |
| 2014/0078061 A1 | 3/2014 | Simons |
| 2014/0078193 A1 | 3/2014 | Barnhoefer |
| 2014/0082369 A1 | 3/2014 | Waclawsky |
| 2014/0111451 A1 | 4/2014 | Park |
| 2014/0118520 A1 | 5/2014 | Slaby |
| 2014/0143304 A1 | 5/2014 | Hegarty |
| 2014/0168093 A1 | 6/2014 | Lawrence |
| 2014/0196119 A1 | 7/2014 | Hill |
| 2014/0200953 A1 | 7/2014 | Mun |
| 2014/0250538 A1 | 9/2014 | Rapaport |
| 2014/0259130 A1 | 9/2014 | Li |
| 2014/0270571 A1 | 9/2014 | Dwan |
| 2014/0283059 A1 | 9/2014 | Sambamurthy |
| 2014/0317028 A1 | 10/2014 | Turgeman |
| 2014/0317726 A1 | 10/2014 | Turgeman |
| 2014/0317734 A1 | 10/2014 | Valencia |
| 2014/0317744 A1 | 10/2014 | Turgeman |
| 2014/0325223 A1 | 10/2014 | Turgeman |
| 2014/0325645 A1 | 10/2014 | Turgeman |
| 2014/0325646 A1 | 10/2014 | Turgeman |
| 2014/0325682 A1 | 10/2014 | Turgeman |
| 2014/0337786 A1 | 11/2014 | Luo |
| 2014/0344927 A1 | 11/2014 | Turgeman |
| 2014/0380179 A1* | 12/2014 | Bose ............... G06Q 10/10 715/738 |
| 2015/0002479 A1 | 1/2015 | Kawamura |
| 2015/0012920 A1 | 1/2015 | De Santis |
| 2015/0062078 A1 | 3/2015 | Christman |
| 2015/0091858 A1 | 4/2015 | Rosenberg |
| 2015/0094030 A1 | 4/2015 | Turgeman |
| 2015/0101031 A1 | 4/2015 | Harjanto |
| 2015/0146945 A1 | 5/2015 | Plan |
| 2015/0205944 A1 | 7/2015 | Turgeman |
| 2015/0205955 A1 | 7/2015 | Turgeman |
| 2015/0205957 A1 | 7/2015 | Turgeman |
| 2015/0205958 A1 | 7/2015 | Turgeman |
| 2015/0212843 A1 | 7/2015 | Turgeman |
| 2015/0213244 A1 | 7/2015 | Lymberopoulos |
| 2015/0213246 A1 | 7/2015 | Turgeman |
| 2015/0213251 A1 | 7/2015 | Turgeman |
| 2015/0256528 A1 | 9/2015 | Turgeman |
| 2015/0256556 A1 | 9/2015 | Kaminsky |
| 2015/0264572 A1 | 9/2015 | Turgeman |
| 2015/0268768 A1 | 9/2015 | Woodhull |
| 2015/0310196 A1 | 10/2015 | Turgeman |
| 2016/0006800 A1 | 1/2016 | Summers |
| 2016/0012465 A1* | 1/2016 | Sharp ............... G06Q 20/384 705/14.17 |
| 2016/0034673 A1 | 2/2016 | Chandra |
| 2016/0042164 A1 | 2/2016 | Goldsmith |
| 2016/0077620 A1 | 3/2016 | Choi |
| 2016/0109969 A1 | 4/2016 | Keating |
| 2016/0132105 A1 | 5/2016 | Turgeman |
| 2016/0164905 A1 | 6/2016 | Pinney Wood |
| 2016/0164906 A1 | 6/2016 | Pinney Wood |
| 2016/0174044 A1 | 6/2016 | Jones |
| 2016/0179245 A1 | 6/2016 | Johansson |
| 2016/0191237 A1 | 6/2016 | Roth |
| 2016/0196414 A1 | 7/2016 | Stuntebeck |
| 2016/0197918 A1 | 7/2016 | Turgeman |
| 2016/0209948 A1 | 7/2016 | Tulbert |
| 2016/0226865 A1 | 8/2016 | Chen |
| 2016/0294837 A1 | 10/2016 | Turgeman |
| 2016/0300054 A1 | 10/2016 | Turgeman |
| 2016/0306974 A1 | 10/2016 | Turgeman |
| 2016/0307191 A1 | 10/2016 | Turgeman |
| 2016/0307201 A1 | 10/2016 | Turgeman |
| 2016/0321445 A1 | 11/2016 | Turgeman |
| 2016/0321689 A1 | 11/2016 | Turgeman |
| 2016/0328572 A1 | 11/2016 | Valacich |
| 2016/0342826 A1 | 11/2016 | Apostolos |
| 2016/0344783 A1 | 11/2016 | Kushimoto |
| 2016/0364138 A1 | 12/2016 | Luo |
| 2016/0366177 A1 | 12/2016 | Turgeman |
| 2016/0371476 A1 | 12/2016 | Turgeman |
| 2017/0011217 A1 | 1/2017 | Turgeman |
| 2017/0012988 A1 | 1/2017 | Turgeman |
| 2017/0017781 A1 | 1/2017 | Turgeman |
| 2017/0032114 A1 | 2/2017 | Turgeman |
| 2017/0034210 A1 | 2/2017 | Talmor |
| 2017/0048272 A1 | 2/2017 | Yamamura |
| 2017/0054702 A1 | 2/2017 | Turgeman |
| 2017/0076089 A1 | 3/2017 | Turgeman |
| 2017/0085587 A1 | 3/2017 | Turgeman |
| 2017/0090418 A1 | 3/2017 | Tsang |
| 2017/0091450 A1 | 3/2017 | Turgeman |
| 2017/0126735 A1 | 5/2017 | Turgeman |

(56) References Cited

U.S. PATENT DOCUMENTS

| | | | |
|---|---|---|---|
| 2017/0140279 | A1 | 5/2017 | Turgeman |
| 2017/0149958 | A1 | 5/2017 | Xian |
| 2017/0154366 | A1 | 6/2017 | Turgeman |
| 2017/0193526 | A1 | 7/2017 | Turgeman |
| 2017/0195354 | A1 | 7/2017 | Kesin |
| 2017/0195356 | A1 | 7/2017 | Turgeman |
| 2017/0221064 | A1 | 8/2017 | Turgeman |
| 2017/0302340 | A1 | 10/2017 | Berlin |
| 2017/0364919 | A1 | 12/2017 | Ranganath |
| 2018/0012003 | A1* | 1/2018 | Asulin ............... G06F 21/316 |
| 2018/0012227 | A1 | 1/2018 | Tunnell |
| 2018/0014189 | A1* | 1/2018 | Ellison ................ H04W 12/06 |
| 2018/0034850 | A1 | 2/2018 | Turgeman |
| 2018/0095596 | A1 | 4/2018 | Turgeman |
| 2018/0103047 | A1 | 4/2018 | Turgeman |
| 2018/0107836 | A1 | 4/2018 | Boger |
| 2018/0115899 | A1 | 4/2018 | Kedem |
| 2018/0121640 | A1 | 5/2018 | Turgeman |
| 2018/0160309 | A1 | 6/2018 | Turgeman |
| 2018/0314816 | A1 | 11/2018 | Turgeman |
| 2018/0349583 | A1 | 12/2018 | Turgeman |
| 2018/0350144 | A1 | 12/2018 | Rathod |
| 2018/0351959 | A1 | 12/2018 | Turgeman |
| 2019/0028497 | A1 | 1/2019 | Karabchevsky |
| 2019/0057200 | A1 | 2/2019 | Sabag |
| 2019/0121956 | A1 | 4/2019 | Turgeman |
| 2019/0156034 | A1 | 5/2019 | Kedem |
| 2019/0158535 | A1 | 5/2019 | Kedem |
| 2019/0220863 | A1 | 7/2019 | Novick |
| 2019/0272025 | A1 | 9/2019 | Turgeman |
| 2019/0342328 | A1 | 11/2019 | Rivner |
| 2019/0342329 | A1 | 11/2019 | Turgeman |

FOREIGN PATENT DOCUMENTS

| | | |
|---|---|---|
| EP | 2477136 | 7/2012 |
| EP | 2477136 A1 | 7/2012 |
| EP | 2610776 | 7/2013 |
| EP | 2610776 A2 | 7/2013 |
| EP | 2646904 B1 | 8/2018 |
| EP | 3019991 B1 | 2/2019 |
| ES | 338092 | 5/2010 |
| ES | 2338092 A1 | 5/2010 |
| WO | 2005099166 | 10/2005 |
| WO | 2005099166 A2 | 10/2005 |
| WO | 2007146437 | 12/2007 |
| WO | 2007146437 A2 | 12/2007 |
| WO | 2012073233 | 6/2012 |
| WO | 2012073233 A1 | 6/2012 |

OTHER PUBLICATIONS

Faisal Alkhateeb et al., "Bank Web Sites Phishing Detection and Notification System Based on Semantic Web technologies", International Journal of Security and its Applications 6(4):53-66, Oct. 2012.

Sungzoon Cho et al., "Artificial Rhythms and Cues for Keystroke Dynamics Based Authentication", International Conference on Biometrics (ICB)—Advances in Biometrics, pp. 626-632, year 2006.

International Search Report for PCT/IB2017/055995, dated Feb. 15, 2018.

Written Opinion of the International Search Authority for PCT/IB2017/055995, dated Feb. 15, 2018.

Supplementary European Search Report for application 11844440 dated Nov. 17, 2017.

International Search Report for application PCT/IB2016/054064 dated Nov. 21, 2016.

International Search Report for application PCT/IB2014/062941 dated Dec. 17, 2014.

International Search Report for application PCT/IB2014/062293 dated Oct. 1, 2014.

International Search Report for application PCT/IL2011/000907 dated Apr. 19, 2012.

Nakkabi et al., "Improving Mouse Dynamics Biometric Performance Using Variance Reduction via Extractors with Separate Features", Nov. 2010, IEEE Transactions on System, Man, and Cybernetics; vol. 40, No. 6.

Nance et al., "Virtual Machine Introspection", IEEE Security & Privacy, 2008.

Garfinkel and Rosenblum, "A virtual Machine Introspection-Based Architecture for Intrusion Detection.", 2003, Proc. Network and Distributed Systems Security Symp., The Internet Society, pp. 191-206.

Spafford et al., "Software Forensics: Can We Track Code to its Authors?", Feb. 1992, Computer Science Technical Report, Purdue e-Pubs, Report No. CSD-TR-92-010.

Tavis Ormandy, "An Empirical Study into the Security Exposure to Hosts of Hostile Virtualized Environments", retrieved from the Internet on May 3, 2017, from: http://taviso.decsystem.org/virtsec.pdf.

Zheng et al., "An Efficient User Verification System via Mouse Movements", Oct. 17-21, 2011, CCS' 11, Chicago, Illinois.

Liston et al., "On the Cutting Edge: Thwarting Virtual Machine Detection"; retrieved from the Internet on May 3, 2017, from: http://docplayer.net/9791309-On-the-cutting-edge-thwarting-virtual-machine-detection.html.

Georgia Frantzeskou et al., "Identifying Authorship by Byte-Level N-Grams: The source Code Author Profile (SCAP) Method", Spring 2007, International Journal of Digital Evidence, vol. 6, issue 1.

Franklin et al., "Remote Detection of Virtual Machine Monitors with Fuzzy benchmarking", ACM SIGOPS Operating Systems Review, V42, Issue 3, Apr. 2008.

Emmanouil Vasilomanolakis, "A honeypot-driven cyber incident monitor: Lessons learned and steps ahead"; Sep. 2015; SIN '15: Proceedings of the 8th International Conference on Security of Information and Networks; Publisher: ACM; pp. 1-7.

International Search Report for PCT international application PCT/IL2018/051246, dated Mar. 11, 2019.

Written Opinion of the International Searching Authority for PCT international application PCT/IL2018/051246, dated Mar. 11, 2019.

Written Opinion of the International Searching Authority for PCT international application PCT/IL2011/000907, dated Apr. 19, 2012.

Written Opinion of the International Searching Authority for PCT international application PCT/IB2014/062293, dated Oct. 1, 2014.

Written Opinion of the International Searching Authority for PCT international application PCT/IB2014/062941, dated Dec. 17, 2014.

Written Opinion of the International Searching Authority for PCT international application PCT/IB2016/054064, dated Jul. 9, 2015.

Syed Ahsan Abbas et al., "What is the difference between a rooted and unrooted Android?" Quora.com, dated Jul. 22, 2016, printed on Aug. 12, 2019 from: www.Quora.com/What-is-the-difference-between-a-rooted-and-un rooted-Android.

Sebastian Lindstrom, "Getting to know asynchronous JavaScript: Callbacks, Promises and Async / Await", Medium.com, dated Jul. 2, 2017, printed on Aug. 12, 2019 from: Medium.com/codebuddies/getting-to-know-asynchronous-javascript-callbacks-promises-and-async-await-17e0673281ee.

Ahmed et al., "A New Biometric Technology Based on Mouse Dynamics", Jul.-Sep. 2007, IEEE Transactions on Dependable and Secure Computing, vol. 4, No. 3, pp. 165-179.

Bailey, Kyle O., "Computer Based Behavioral Biometric Authentication via Multi-Modal Fusion", Thesis, 2013, Air Force Insitute of Technology.

Elizabeth Stinson and John C. Mitchell, "Characterizing the Remote Control Behavior of Bots", Detection of Intrusions and Malware, and Vulnerability Assessment. Springer Berlin Heidelberg, p. 89-108. Dec. 31, 2007.

Todorov, "Optimality Principles in Sensorimotor Control (Review)", Sep. 2004, Nature Neuroscience 7, pp. 907-915.

Cleeff et al., "Security Implications of Virtualization: A Literature Study", Science and Engineering, 2009.

Hibbeln et al., "Detecting Deception in Online Environments: Measuring Fraud Through Mouse Cursor Movements", Jun. 7, 2014, Gmunden Retreat on NeuroIS 2014 Gmunden Austria, p. 38.

(56) References Cited

OTHER PUBLICATIONS

Ferrie Peter, "Attack on Virtual Machine Emulators", Symantec Technology Exchange, 2007.

Yampolskiy et al., "Behavioural Biometrics: a survey and classification", 2008, International Journal of Biometrics, vol. 1, No. 1, pp. 81-113.

Provos et al., 2007, "The Ghost in the Browser: Analysis of Web-based Malware".

Huang Yao-Wen et al., "Web application security assessment by fault injection and behavior monitoring", 2003, Proceedings of the 12th international conference on World Wide Web, ACM.

Ben Hansen, "The Blur Busters Mouse Guide", dated Feb. 1, 2014; printed from the Internet on Aug. 5, 2019 from: https://www.blurbusters.com/faq/mouse-guide/.

Chris Cain, "Analyzing Man-in-the-Browser (MITB) Attacks", dated Dec. 2014; downloaded from the Internet on Aug. 5, 2019 from: https://www.sans.org/reading-room/whitepapers/forensics/analyzing-man-in-the-browser-mitb-attacks-35687.

\* cited by examiner

METHOD, DEVICE, AND SYSTEM OF DIFFERENTIATING BETWEEN A CYBER-ATTACKER AND A LEGITIMATE USER

CROSS-REFERENCE TO RELATED APPLICATIONS

This application is a Continuation-in-Part (CIP) of U.S. Ser. No. 14/675,764, filed on Apr. 1, 2015, which is hereby incorporated by reference in its entirety.

The above-mentioned U.S. Ser. No. 14/675,764 claims priority and benefit from U.S. 61/973,855, filed on Apr. 2, 2014, which is hereby incorporated by reference in its entirety.

The above-mentioned U.S. Ser. No. 14/675,764 is a Continuation-in-Part (CIP) of, and claims priority and benefit from, U.S. Ser. No. 14/566,723, filed on Dec. 11, 2014, now U.S. Pat. No. 9,071,969; which is a Continuation of U.S. Ser. No. 13/922,271, filed on Jun. 20, 2013, now U.S. Pat. No. 8,938,787; which is a Continuation-in-Part (CIP) of U.S. Ser. No. 13/877,676, filed on Apr. 4, 2013, now U.S. Pat. No. 9,069,942; which is a National Stage of PCT International Application number PCT/IL2011/000907, having an International Filing Date of Nov. 29, 2011; which claims priority and benefit from U.S. 61/417,479, filed on Nov. 29, 2010; all of which are hereby incorporated by reference in their entirety.

The above-mentioned U.S. Ser. No. 14/675,764 is a Continuation-in-Part (CIP) of, and claims priority and benefit from, U.S. Ser. No. 14/320,653, filed on Jul. 1, 2014, now U.S. Pat. No. 9,275,337; which claims priority and benefit from U.S. 61/843,915, filed on Jul. 9, 2013; all of which are hereby incorporated by reference in their entirety.

The above-mentioned U.S. Ser. No. 14/675,764 is a Continuation-in-Part (CIP) of, and claims priority and benefit from, U.S. Ser. No. 14/320,656, filed on Jul. 1, 2014, now U.S. Pat. No. 9,665,703; which claims priority and benefit from U.S. 61/843,915, filed on Jul. 9, 2013; all of which are hereby incorporated by reference in their entirety.

The above-mentioned U.S. Ser. No. 14/675,764 is a Continuation-in-Part (CIP) of, and claims priority and benefit from, U.S. Ser. No. 14/325,393, filed on Jul. 8, 2014, now U.S. Pat. No. 9,531,733; which claims priority and benefit from U.S. 61/843,915, filed on Jul. 9, 2013; all of which are hereby incorporated by reference in their entirety.

The above-mentioned U.S. Ser. No. 14/675,764 is a Continuation-in-Part (CIP) of, and claims priority and benefit from, U.S. Ser. No. 14/325,394, filed on Jul. 8, 2014, now U.S. Pat. No. 9,547,766; which claims priority and benefit from U.S. 61/843,915, filed on Jul. 9, 2013; all of which are hereby incorporated by reference in their entirety.

The above-mentioned U.S. Ser. No. 14/675,764 is a Continuation-in-Part (CIP) of, and claims priority and benefit from, U.S. Ser. No. 14/325,395, filed on Jul. 8, 2014, now U.S. Pat. No. 9,621,567; which claims priority and benefit from U.S. 61/843,915, filed on Jul. 9, 2013; all of which are hereby incorporated by reference in their entirety.

The above-mentioned U.S. Ser. No. 14/675,764 is a Continuation-in-Part (CIP) of, and claims priority and benefit from, U.S. Ser. No. 14/325,396, filed on Jul. 8, 2014; which claims priority and benefit from U.S. 61/843,915, filed on Jul. 9, 2013; all of which are hereby incorporated by reference in their entirety.

The above-mentioned U.S. Ser. No. 14/675,764 is a Continuation-in-Part (CIP) of, and claims priority and benefit from, U.S. Ser. No. 14/325,397, filed on Jul. 8, 2014, now U.S. Pat. No. 9,450,971; which claims priority and benefit from U.S. 61/843,915, filed on Jul. 9, 2013; all of which are hereby incorporated by reference in their entirety.

The above-mentioned U.S. Ser. No. 14/675,764 is a Continuation-in-Part (CIP) of, and claims priority and benefit from, U.S. Ser. No. 14/325,398, filed on Jul. 8, 2014, now U.S. Pat. No. 9,477,826; which claims priority and benefit from U.S. 61/843,915, filed on Jul. 9, 2013; all of which are hereby incorporated by reference in their entirety.

FIELD

The present invention is related to the security of electronic devices and systems.

BACKGROUND

Millions of people utilize mobile and non-mobile electronic devices, such as smartphones, tablets, laptop computers and desktop computers, in order to perform various activities. Such activities may include, for example, browsing the Internet, sending and receiving electronic mail (email) messages, taking photographs and videos, engaging in a video conference or a chat session, playing games, or the like.

Some activities may be privileged, or may require authentication of the user in order to ensure that only an authorized user engages in the activity. For example, a user may be required to enter a username and a password in order to access an email account, or in order to access an online banking interface or website.

SUMMARY

The present invention may include, for example, systems, devices, and methods for detecting the identity of a user of an electronic device; for determining whether or not an electronic device is being used by a fraudulent user or by a legitimate user; and/or for differentiating among users of a computerized service or among users of an electronic device.

Some embodiments of the present invention may comprise devices, systems, and methods of detecting user identity, differentiating between users of a computerized service, and detecting a possible attacker.

The present invention may provide other and/or additional benefits or advantages.

DETAILED DESCRIPTION OF THE PRESENT INVENTION

Figure 1A:
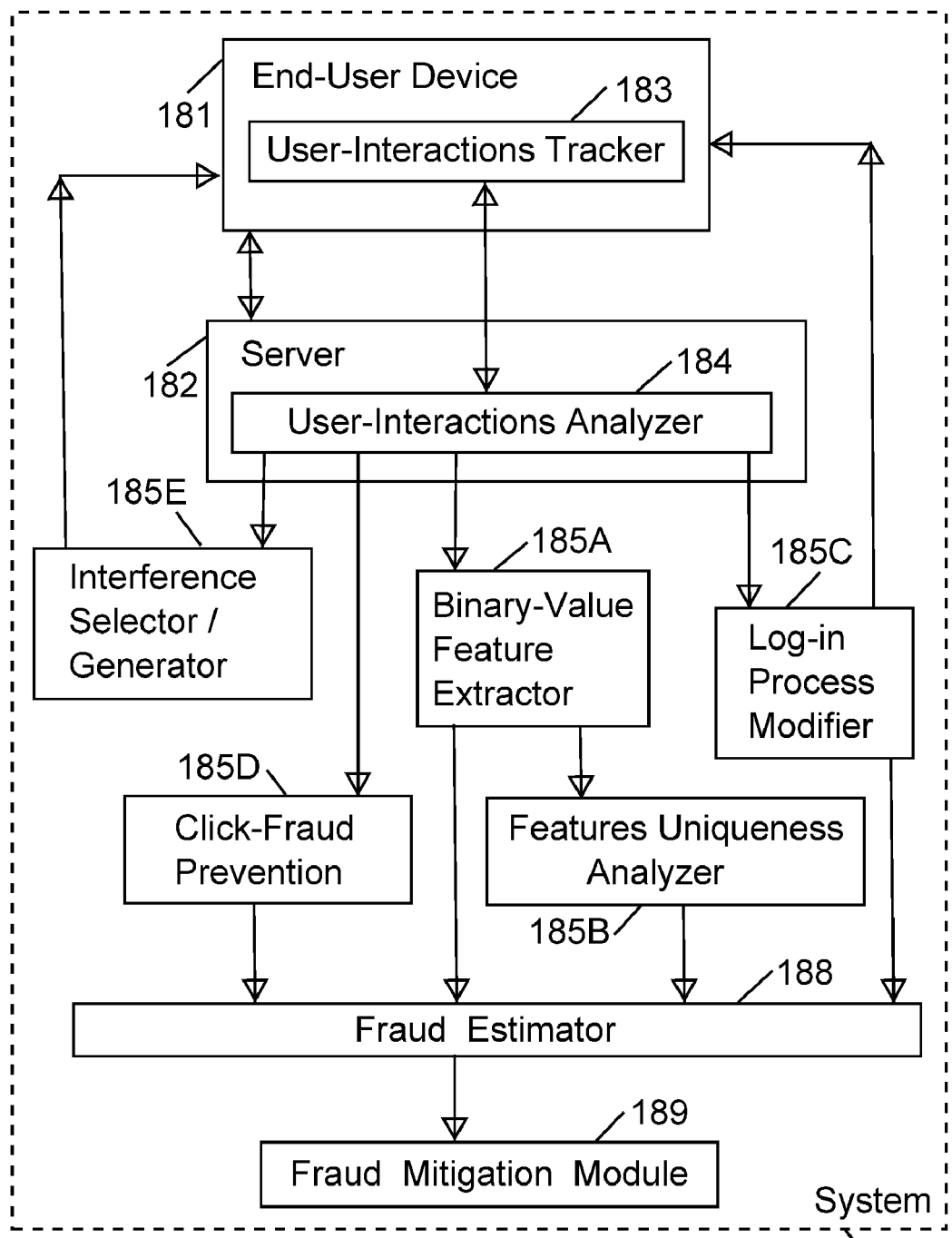
FIG. 1A is a schematic block-diagram illustration of a system, in accordance with some demonstrative embodiments of the present invention.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Applicants have realized that when a user is entering a value, moving between fields in a form or web-page, or otherwise navigating inside a web-page or a mobile application, there may often be more than one way to carry out the same activity or to achieve the same result or to complete the same goal. The way in which a user's mind perceives a task corresponds to a Cognitive Choice of that particular user.

Applicants have further realized that cyber-criminals typically demonstrate cognitive choices that are unlikely for regular (authorized, legitimate, non-fraudulent) users to conduct. For example, Applicants have realized that when transferring (wiring) money through an online service (e.g., a banking website or a banking application, or a banking web-based interface), cyber-criminals who operate in the victim's account after gaining illegal access may often avoid typing the amount of money to be transferred or wired; and instead cyber-criminals may "paste" the amount of money after they "copy" it as a string from a pre-defined instructions list or data-sheet that they (or someone else) had prepared. Such behavior is very rarely observed in genuine (legitimate, authorized) money transfers or wire transfers, performed by authorized users, who often manually type the amount of money to be transferred or wired, and never or rarely do they perform copy-and-paste operations in order to fill-in the crucial data-item of the amount to be transferred.

Similarly, when setting up multiple new accounts based on synthetic identities or stolen identities or other fake data, cyber-criminals may often copy-and-paste the applicant name (or the beneficiary name, or the funds recipient name, or the like) from a ready, previously-prepared list or data-sheet or spreadsheet; and this reflects another cognitive choice that is not likely to occur when a legitimate (authorized) user creates or operates the online account.

Other types of cognitive choices may be indicative of genuine, authorized and/or legitimate activity of a user, and may indicate that the activity is non-fraudulent. For example, the utilization of auto-complete of a password or a username (e.g., in a form, or a web-form or web-interface) instead of typing such data-items (and instead of copy-and-paste operations) may indicate a legitimate or authorized user, since a fraudster may either type the password or paste it from a list of victim data.

Similarly, the use of copy-and-paste operations in certain particular fields in a form or a screen, but not in other particular fields in the same form or screen (or in the same application or website), may be indicative of genuine user activity. For example, copying-and-pasting a 16-digit bank sort code, but also manually typing the account number and beneficiary name, may be indicative of legitimate user activity; whereas, a fraudster is more likely to copy-and-paste the data into all of these fields.

The present invention may thus track the user's cognitive choices, as they are reflected in user interactions, input and/or output, and may identify occurrences or sequences that are indicative of criminal behavior or criminal intent or fraudulent intent, as well as sequences that are indicative of genuine (or legitimate, or authorized) behavior or activity. Accordingly, even if there is no previously-generated user-specific behavioral profile for a given user (e.g., for the currently-monitored user), the system may still find evidence in the communication session itself that may increase or decrease the assessed risk or fraud with regard to the specific user who engages in the current specific session of interactions.

Reference is made to FIG. 1A, which is a schematic block-diagram illustration of a system 180 in accordance with some demonstrative embodiments of the present invention. System 180 may comprise, for example, an end-user device 181 able to communicate with a server 182 of a computerized service. End-user device 181 may comprise a user-interactions tracker 183, for example, implemented as JavaScript code included in (or triggered from) HTML page(s) that are served by server 182 to a Web-browser of end-user device 181. User-interactions tracker 183 may track and log locally all the user interactions that are performed via mouse, keyboard, touch-screen, and/or other input unit(s). User-interactions tracker 183 may send or upload the user-interactions data to server 182, where a user-interactions analyzer 184 may analyze and process such data. Multiple modules or sub-modules may operate to deduce or determine or estimate fraud-related or threat-related parameters, based on analysis of the user-interactions data. For example, a data-entry scorer, a typing-rate scorer, a user-maneuvering scorer, a deletion-based scorer, and a user-familiarity scorer, may operate to estimate threat-levels or fraud-scores that are associated with particular interactions or sets of interactions, as described herein. A fraud estimator 188 may utilize the weighted outputs of these modules, to estimate an aggregated threat-level or fraud-score associated with the particular user or session or account; and to accordingly trigger a fraud mitigation module 189 to perform one or more fraud mitigation operations.

Figure 1B:
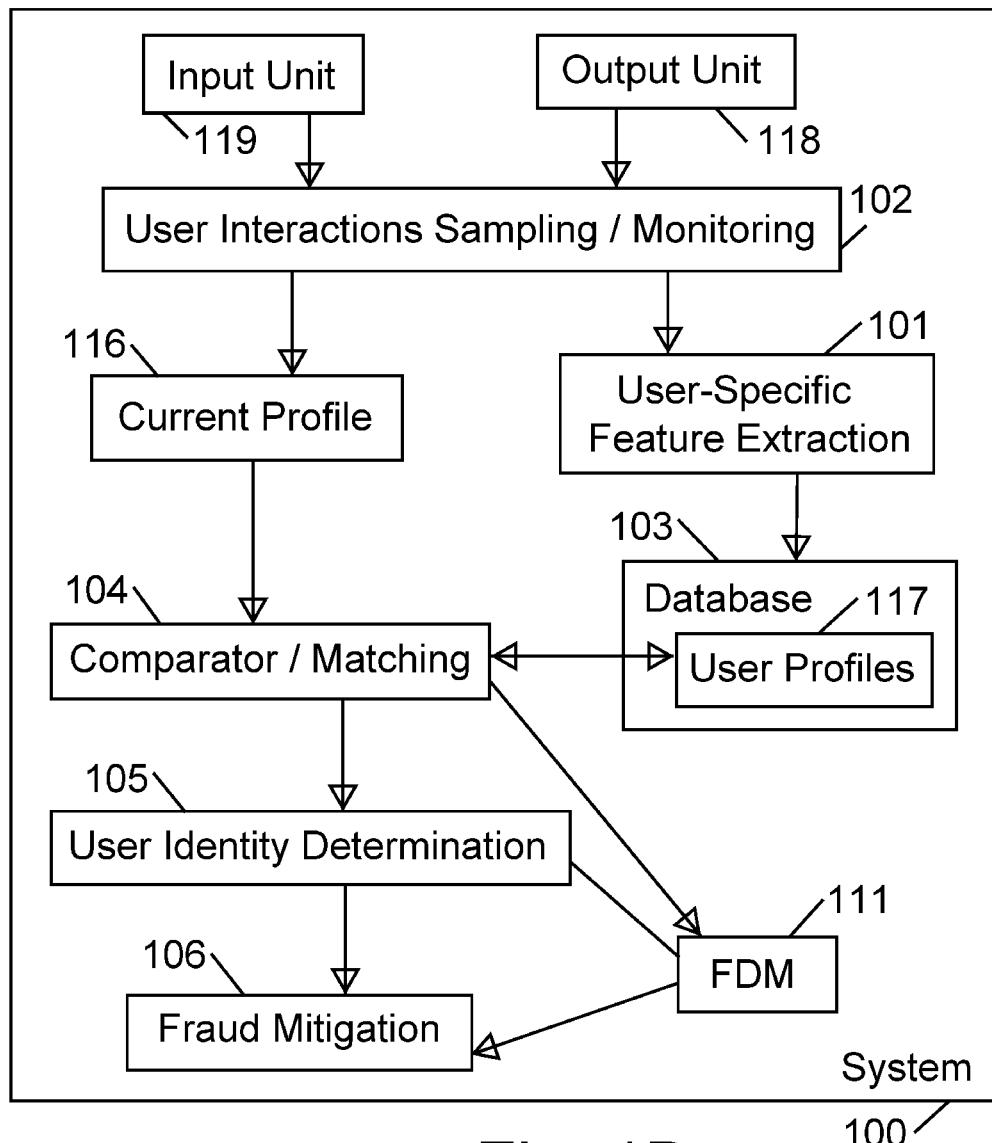
FIG. 1B is a schematic block-diagram illustration of a system, in accordance with some demonstrative embodiments of the present invention.

Reference is made to FIG. 1B, which is a schematic block-diagram illustration of a system 100 in accordance with some demonstrative embodiments of the present invention. System 100 may comprise, for example, an input unit 119, an output unit 118, a user interactions sampling/monitoring module 102, a user-specific feature extraction module 101, a database 103 to store user profiles 117, an ad-hoc or current user profile 116, a comparator/matching module 104, a user identity determination module 105, a Fraud Detection Module (FDM) 111, and a fraud mitigation module 106.

System 100 may monitor interactions of a user with a computerized service, for example, user interactions performed via an input unit 119 (e.g., mouse, keyboard, stylus, touch-screen) and an output unit 118 (e.g., monitor, screen, touch-screen) that the user utilizes for such interactions at the user's computing device (e.g., smartphone, tablet, laptop computer, desktop computer, or other electronic device). For example, a user interactions monitoring/sampling module 102 may monitor all user interactions via the input unit 119 and/or the output unit 118; and may record, log, track, capture, or otherwise sample such user interactions; and/or may otherwise collect user interaction data.

In a demonstrative implementation, for example, an end-user may utilize a computing device or an electronic device in order to launch a Web browser and browse to a website or web-based application of a computerized service (e.g., a banking website, a brokerage website, an online merchant, an electronic commerce website). The web-server of the computerized service may serve code, for example HTML code, that the Web browser of the end-user device may parse and may display and/or execute. In accordance with the present invention, for example, a JavaScript code or code-portion may be served to the Web-browser of the end-user device; or may otherwise be "called from" or loaded from an HTML page that is served to the end-user device. The JavaScript code may operate as a "silent key-logger" module, and may monitor an track and log all the user interactions via keyboard, mouse, touch-screen, and/or other input units, as well as their timing; and may write or upload or send such information to the web-server or to a third-party server in which the user interactions monitoring/sampling module 102 may reside. In some embodiments, such "silent key-logger" may be implemented such that it logs or records or stores or uploads to the server, or analyzes, only anonymous data, or only data that excludes the actual content of user interactions, or only data that on its own does not enable identification of the user or of the content that the use types; e.g., by logging or storing only the data-entry rate or timing, or the key-presses rate or timing, and while not storing (or while discarding) the actual key-presses or content types; for example, logging and storing that the user typed eight characters in two seconds, rather than logging and typing that the user types the word "Jonathan" in two seconds. The data describing the user interactions may be sent or uploaded, for example, every pre-defined time interval (e.g., every second, or every 3 or 5 or 10 seconds), or once a buffer of interactions is filled (e.g., once 20 keystrokes are logged; once 6 mouse-clicks are logged). Other suitable methods may be used to monitor and log user interactions.

The user interaction data may enable a user-specific feature extraction module 101 to extract or estimate or determine or calculate user-specific features that characterize the interaction and which are unique to the user (or, which are probably unique to the user). The user-specific feature extraction module 101 may store in a database 103 multiple user profiles 117, corresponding to various users of the computerized service. A user may have a single stored profile 117; or a user may have multiple stored profiles 117 that correspond to multiple usage sessions of that user (e.g., across multiple days; or across multiple usage sessions that begin with a log-in and end with a log-out or a time-out).

Once a user accesses (or attempts to access) the computerized service, and/or during the access of the user to the computerized service, the user interaction monitoring/sampling module 102 may monitor or sample the current user interactions; and the user-specific feature extraction module 101 may optionally create a current or ad-hoc user profile 116 that characterizes the user-specific features that are currently exhibited in the current session of user interactions.

A comparator/matching module 104 may compare or match, between: (i) values of user-specific features that are extracted in a current user session (or user interaction), and (ii) values of respective previously-captured or previously-extracted user-specific features (of the current user, and/or of other users, and/or of pre-defined sets of values that correspond to known automated scripts or "bots"). In some implementations, the comparator/matching module 104 may compare between the current ad-hoc user profile 116, and one or more previously-stored user profiles 117 that are stored in the database 103.

If the comparator/matching module 104 determines that one or more features, or a set of features, that characterize the current interaction session of the current user, does not match those features as extracted in previous interaction session(s) of that user, then, a possible-fraud signal may be generated and may be sent or transmitted to other modules of the system 100 and/or to particular recipients.

Additionally or alternatively, the comparator/matching module 104 may compare the features characterizing the current session of the current user, to features characterizing known automatic fraudulent mechanisms, known as malware or "bot" mechanisms, or other pre-defined data, in order to determine that, possibly or certainly, the current user is actually a non-genuine user and/or is accessing the service via a fraudulent mechanism.

In some embodiments, the comparator/matching module 104 may comprise, or may operate in association with, a Fraud Detection Module (FDM) 111, which may comprise (or may be implemented as) one or more sub-modules, as described herein.

In some embodiments, the output of the comparator/matching module 104 may be taken into account in combination with other information that the fraud detection module 111 may determine to be relevant or pertinent, for example, security information, user information, meta-data, session data, risk factors, or other indicators (e.g., the IP address of the user; whether or not the user is attempting to perform a high-risk activity such as a wire transfer; whether or not the user is attempting to perform a new type of activity that this user did not perform in the past at all, or did not perform in the past 1 or 3 or 6 or 12 months or other time-period; or the like).

The combined factors and data may be taken into account by a user identity determination module 105, which may determine whether or not the current user is a fraudster or is possibly a fraudster. The user identity determination module 105 may trigger or activate a fraud mitigation module 106 able to perform one or more fraud mitigating steps based on that determination; for example, by requiring the current user to respond to a challenge, to answer security question(s), to contact customer service by phone, to perform a two-step authentication or two-factor authentication, or the like.

System 100 and/or system 180 may be implemented by using suitable hardware components and/or software modules, which may be co-located or may be distributed over multiple locations or multiple devices. Components and/or modules of system 100 and/or system 180 may interact or communicate over one or more wireless communication links, wired communication links, cellular communication, client/server architecture, peer-to-peer architecture, or the like Some embodiments of the present invention may enable detection or estimation of criminal intent (or fraudulent intent, or criminal activity, or unauthorized computerized activity or transactions) based on identification and analysis of Cognitive Choices that are reflected in user interactions.

Figure 2:
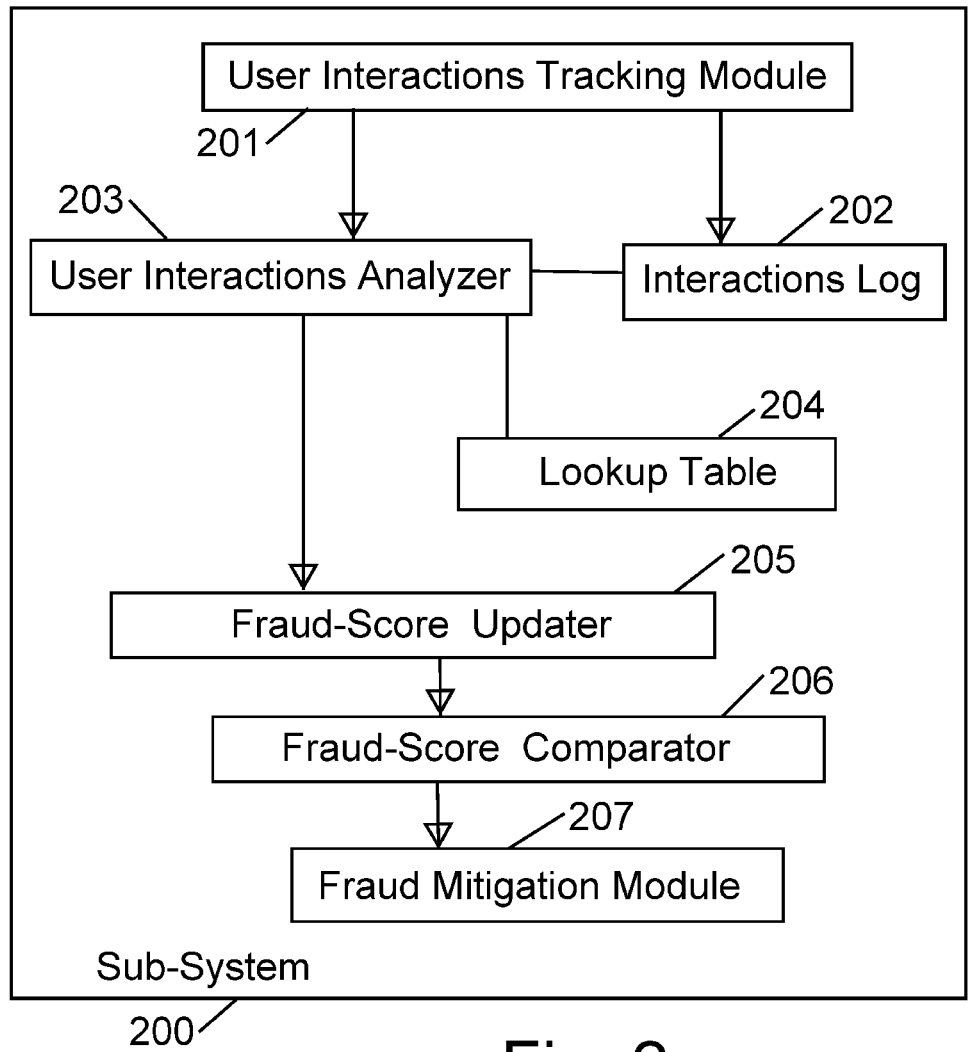
FIG. 2 is a schematic block-diagram illustration of a fraud detection sub-system, in accordance with some demonstrative embodiments of the present invention.

Reference is made to FIG. 2, which is a schematic block-diagram illustration of a fraud detection sub-system 200 in accordance with some demonstrative embodiments of the present invention. For example, sub-system 200 may operate to detect or to estimate, for example: fraud, fraud attempts, fraudulent computerized operations, unauthorized computerized operations, computerized operations that breach or violate a law or a regulation or policy or terms-of-use or an intended use of a service or website or application, or fraudulent activity. Sub-system 200 may further operate to distinguish or differentiate among users (or to detect fraud) based on an analysis of cognitive choices that the user(s) perform and that are reflected in the computerized device or system or service. Sub-system 200 may be implemented as part of, or as a sub-module of, the fraud detection module 111 of FIG. 1B, the system 100 of FIG. 1B, the system 180 of FIG. 1A, the fraud estimator 188 of FIG. 1A, and/or other suitable systems or modules.

In some embodiments, sub-system 200 may comprise a user interaction tracking module 201, which may track the user interactions (e.g., keyboard presses, mouse-clicks, mouse-movements, touch-screen taps, and/or other user gestures) when the user interacts with a computerized service via an electronic device (e.g., desktop computer, laptop computer, tablet, smartphone, or the like). The user interaction tracking module 201 may observe and/or record and/or log all such user interactions, and may optionally store them in an interactions log 202 or other database or repository.

In some embodiments, a user interactions analyzer 203 may review the tracked user interaction, in real time, or substantially in real time (e.g., within one second or within three seconds of the occurrence or completion of an interaction), or at pre-defined time intervals (e.g., every ten seconds, every 60 seconds), or at pre-defined triggering events (e.g., upon clicking of a "submit" button or a "confirm" button of an online form), or in retrospect (e.g., once a day in retrospect for all the daily interactions that reflect transactions that are in a pipeline for review prior to execution; or as part of a post-action audit process or crime investigation process). The user interactions analyzer 203 may look for a particular user interaction, or for a set or sequence or group or batch of consecutive user interactions, or for a set or sequence or group or batch of non-consecutive user interactions, that are pre-defined as indicative of possible fraud activity (or alternatively, as pre-defined in the system as indicative of legitimate non-fraudulent activity).

For example, a pre-populated lookup table 204 may be used by user interactions analyzer 203 in order to detect or to estimate fraud, or conversely in order to reassure the system that the user is indeed a legitimate user. For example, each row in lookup table 204 may correspond to a GUI element, or to a particular type of user interaction; and each such row may indicate whether a particular type of engagement with that GUI element (or with that type of user interaction) is indicative or fraud, or of authorized usage (and in some implementations: or if such interaction is "neutral" and indicates neither fraud nor legitimate usage). A demonstrative portion of such lookup table is shown herein as Table 1, with regard to a particular, single, type of user interaction:

TABLE 1

| User Interaction: | Indicative Of: |
| --- | --- |
| Manual typing of wire transfer amount into the "amount to transfer" field | Legitimate User |
| Copy-and-paste of a numerical string into the "amount to transfer" field | Attacker |

In another implementation, lookup table 204 may store data relating to multiple different fields in the same form or screen, or in the same application or group of pages of the same application (and not only related to the same data field); for example, as demonstrated in Table 2:

TABLE 2

| User Interaction: | Indicative Of: |
| --- | --- |
| Manual typing of username into the "username" field | Legitimate User |
| Copy-and-paste of username into the "username" field | Attacker |
| Manual typing of password into the "password" field | Legitimate User |
| Copy-and-paste of password into the "password" field | Attacker |

In another demonstrative implementation, lookup table 204 may store data relating to multiple different fields that are taken in combination with each other as a batch; for example, as demonstrated in Table 3:

TABLE 3

| Multiple-Field User Interaction: | Indicative Of: |
| --- | --- |
| Manual typing of username and also manual typing of password | Legitimate User |
| Copy-and-paste of username and also copy-and-paste of password | Attacker |
| Copy-and-paste of username and also manual typing of password | Legitimate User |
| Manual typing of username and also copy-and-paste of password | Legitimate User |

In another implementation, lookup table 204 may store data relating to multiple different fields that are taken in combination with each other as a batch, in a manner that allows for certain combinations to be indicative of an attacker, whereas other combinations may be indicative of a legitimate user, whereas still other combinations may be regarded as "neutral" and may be indicative of neither an attacker nor a legitimate user; for example, as demonstrated in Table 4:

TABLE 4

| Multiple-Field User Interaction: | Indicative Of: |
| --- | --- |
| Manual typing of username and also manual typing of password | Legitimate User |
| Copy-and-paste of username and also copy-and-paste of password | Attacker |
| Copy-and-paste of username and also manual typing of password | Neutral |
| Manual typing of username and also copy-and-paste of password | Neutral |

In another implementation, lookup table 204 may store data relating to multiple different fields that are taken in combination with each other as a batch, in a manner that allows for certain combinations to be indicative of an attacker; for example, as demonstrated in Table 4:

TABLE 5

| Multiple-Field User Interaction: | Indicative Of: |
| --- | --- |
| Manual typing of beneficiary name and also manual typing of transfer amount and also copy-and-paste of bank routing number | Legitimate User |
| Copy-and-paste of beneficiary name and also copy-and-paste of transfer amount and also copy-and-paste of bank routing number | Attacker |

TABLE 5-continued

| Multiple-Field User Interaction: | Indicative Of: |
|---|---|
| Manual typing of beneficiary name and also copy-and-paste of transfer amount and also copy-and-paste of bank routing number | Attacker |

In some embodiments, the user interactions analyzer 203 may operate in conjunction with a fraud-score updater 205, which may store and update a score indicating the likelihood that the current user (e.g., the user who is currently engaging or interacting with the online service; and/or the user who is currently logged-in to the online service) is an unauthorized attacker. For example, in a demonstrative implementation, the fraud-score may be reset to zero upon commencement of an access to the computerized service (e.g., upon finishing the log-in process; or earlier, immediately upon accessing the online service or the computerized service and even prior to entering any log-in credentials). Optionally, the lookup table 204 may further comprise a fraud-score increment, indicating the number of points that should be added to (or reduced from) the fraud-score upon detection of a particular user interaction.

For example, the initial fraud-score may be set to zero. Then, the user interactions analyzer 203 may detect that the user performed copy-and-paste of a string into the Username field of the log-in form; this operation may be associated (e.g., in the lookup table 204) with an increase of 5 points of fraud-score; and the fraud-score updater 205 may thus increase the fraud-score from 0 points to 5 points. It is clarified that the lookup table 204, or other suitable formula or mechanism, may be utilized in order to associate each detected risk with a change in fraud-score (or in threat-level); and the fraud-score updater 205 may take into account such fraud-score modifiers, based on such lookup table 204 or based on other parameters or formulas or weighting-formulas that indicate fraud-score modifications.

Then, the user interactions analyzer 203 may detect that the user performed copy-and-paste of a string into the Password field of the log-in form; this operation may be associated (e.g., in the lookup table 204) with an increase of only 2 points of fraud-score (for example, because some legitimate users store their passwords in a file or list); and the fraud-score updater 205 may thus increase the fraud-score from 5 points to 7 points.

Then, the user interactions analyzer 203 may detect that the user performed manual typing of an amount of money to be transferred in a requested wire transfer. Such manual typing (and not copy-and-paste operation) in the particular field of amount of money to be transferred, may be associated (e.g., in the lookup table 204) with no change in the fraud-score; and the fraud-score updater 205 may thus maintain the fraud-score at 7 points, without modifications. In other implementations, such manual typing of this data-item may be associated with a decrease in the fraud-score; and the fraud-score updater 205 may thus decrease the fraud-score accordingly.

Then, the user interactions analyzer 203 may detect that the user performed copy-and-paste of a string into the Beneficiary Account field of the log-in form; this operation may be associated (e.g., in the lookup table 204) with an increase of 4 points of fraud-score; and the fraud-score updater 205 may thus increase the fraud-score from 7 points to 11 points.

A fraud-score comparator 206 may dynamically check the current value of the fraud-score, against a pre-defined threshold value. For example, it may be pre-defined in the system that a fraud-score of 10-or-more points is a first threshold; and that a threshold of 15-or-more points is a second threshold. The fraud-score comparator 206 may determine that the current value of the fraud-score, which is 11 points, is greater than the first threshold; and may trigger or activate a fraud mitigation module 207 to perform one or more pre-defined operations for this level of fraud-score (e.g., require the user to perform two-factor authentication or two-step authentication). Optionally, the fraud-score comparator may continue to monitor the dynamically-updating fraud-score, and may take different actions based on the current fraud-score; for example, detecting that the current fraud-score is also greater than the second threshold value, and triggering the fraud mitigation module to perform one or more other operations (e.g., requiring the user to actively call a telephone support line or a fraud department of the computerized service).

Some embodiments of the present invention may detect or estimate fraud (or fraudulent activity, or a fraudulent user) based on estimating the familiarity and/or the non-familiarity of the user with one or more data-items (or portions) of the inputted content.

Applicants have realized that a legitimate human user, who interacts with a particular online service or activity (e.g., an online banking interface, or online banking web-site or web-page), is typically familiar or very familiar with particular portions of the inputted content, and is typically less familiar or non-familiar with other particular portions of the inputted content.

For example, a legitimate human user may be familiar or very familiar with his username and/or password, or with names of beneficiaries or payees for wire transfer, or with names of stocks that he traded in the past or that he often trades; and thus he may type these content items rapidly and/or smoothly and/or continuously and/or without performing delete operations. Whereas, a legitimate human user may typically be less familiar with other content items or data-items that he may need to input, for example, account number and/or banking routing number of a beneficiary or payee for a wire transfer, or an address or account number of a payee or beneficiary; and a legitimate human user may typically type or enter these content items less smoothly and/or more slowly and/or while using delete operations.

Applicants have further realized that in contrast, a "fraudster" or an unauthorized user or an attacker may be generally unfamiliar with all or most of the content items or data-items that need to be inputted; and therefor may be characterized by having the same speed or similar speed or uniform speed or generally-constant speed (or same frequency, or uniform frequency, or generally-constant frequency, or similar frequency) of inputting all or most of the required content-items or data-items.

The present invention may thus track and log and monitor, and may process and analyze, the rate and/or speed and/or frequency at which the user inputs data-items and/or content items, in order to differentiate between a legitimate (authorized) human user and an attacker or unauthorized human user (or "fraudster").

In a demonstrative example, the system may determine that a user that enters his username and password quickly, and then enters a beneficiary name quickly, and then enters the beneficiary bank account slowly, may be characterized as a legitimate (authorized human user); whereas, in contrast, a user who enters all the above-mentioned content items slowly, or a user that enters all the above-mentioned content at approximately the same rate or speed, may be characterized as a fraudulent user or an attacker.

In accordance with the present invention, similar data-entry rate changes (or generally-consistent data-entry rate) may be detected (e.g., by a data entry rate analyzer 303, as described herein) and may be utilized for fraud detection, with regard to other operations during a communication session or during an interaction session or usage session; for example, performing of online operations or actions, performing mouse-clicks, typing, movement among fields or tabs, or the like.

Some embodiments may utilize a user differentiation rule, according to which: a user who enters data (or types data) into all fields at a generally constant or fixed rate or speed, is possibly an attacker and not an authorized user; since a regular or authorized user is typically not equally familiar or not equally intimate with the data-items of the various fields. For example, an authorized user is typically more familiar with certain data-items (e.g., name, home address, username), while he is also less familiar with certain other data-items (e.g., the routing number of his bank account; the routing number of a beneficiary for wire transfer; the address of a payee or an intended beneficiary of payment). Such rule(s) may be used by the system in order to differentiate between an authorized user and an attacker.

Some embodiments may utilize a user differentiation rule, according to which: a genuine user typically does not make a typographical error when writing his own name, and therefore, a genuine user does not delete characters when typing his own name. In contrast, an attacker is less familiar with the name of the user being impersonated by the attacker, and may make a typographical error when typing the name, and may need to use delete operation(s) during the entry of the name of the user. Such rule(s) may be used by the system in order to differentiate between an authorized user and an attacker.

Some embodiments may utilize a user differentiation rule, according to which: a genuine user (non-attacker), who creates a new account at a computerized service for the first time (e.g., creates a new online account for online banking or online brokerage or credit card management, or the like), is typically unfamiliar with the flow and/or content of screens or pages that are presented to him in sequence as part of the account-creation process; whereas, in contrast, an attacker is more likely to be more familiar with the flow and/or content of screens or pages that are presented to him in sequence as part of the account-creation process (e.g., because the attacker had already attacked that computerized service recently or in the past; or since the attacker had already spent time preparing for his cyber-attack and had already reviewed the screens or pages that are part of the account-creation process). Accordingly, a genuine user will most likely exhibit the same speed or data-entry rate when measured across multiple screens or pages of the account-creation process, since he is generally unfamiliar with all of them, and his data-entry speed or rate would most likely be relatively low (e.g., below a pre-defined threshold of characters-per-second or fields-per second); whereas in contrast, an attacker would most likely be more familiar with such screens or pages of the account-creation process, and his data-entry rate across multiple screens or pages would be relatively high (e.g., above a pre-defined threshold of characters-per-second or fields-per-second). Such rule(s) may be used by the system in order to differentiate between an authorized user and an attacker.

In some embodiments, an "invisible challenge" may be generated and used in order to further fine-tune the differentiation between a genuine new user who creates a new online account, and an attacker who creates a new online account. For example, the account creation-process may comprise three screens or three pages: a first screen requesting the user to define a username, a password, and security questions; a second screen requesting the user to enter his name and contact information; and a third screen requesting the user to select or configure preferred settings for the online account being created. In accordance with the present invention, the computerized system may always commence the account-creation process with the first screen; but then, may randomly or pseudo-randomly (or, when other possible-fraud indication(s) are triggered) may switch or swap the order of (or may "shuffle" the order of) the next account-creation screens or pages; such that, for example, the above-mentioned third screen (settings configuration) would be presented to the user prior to presenting to the user the above-mentioned second screen (personal information). The system may utilize a rule representing that a genuine new user would not be "surprised" by this change-in-order, since it is his first time of engaging with the account-creation process, and such genuine user would not exhibit any different behavior, and would maintain his regular typing-speed or data-entry speed, and would not exhibit delays or "correction operations" (e.g., would not click on the Back button of the browser or the account-creation process); whereas in contrast, an experienced attacker (even with relatively little experience) would be "surprised" by this change-in-order, may reduce his typing-speed, may delay his response(s), and/or may attempt to perform such "correction operations". Other modifications may be introduced or injected into the account-creation process, in order to elicit delays or other responses from an attacker; for example, switching or swapping or "shuffling" the order in which fields are presented within a form or page or screen; changing the on-screen location of GUI elements (e.g., the Submit button or the Next/Back buttons); adding a redundant question that is not required for the account-creation process (e.g., "How did you hear about us?"); or the like. A genuine user would not experience any "surprising changes" here, and would not modify his data-entry patterns; whereas an experienced attacker would be surprised and would exhibit changes in his data-entry patterns or speed, in his navigation or interactions, or the like. Such rule(s) may be used by the system in order to differentiate between an authorized user and an attacker.

In some embodiments, intentional or random or pseudo-random changes or interferences, may be introduced to inter-page navigation mechanisms that are utilized by the user within a single page or screen. In a first example, the system may observe that a particular user is utilizing the Tab key frequently in order to move between fields in a form; and therefore, after a few such identified utilizations of the Tab key, the system may intentionally introduce a Tab key related interference, for example, which causes the pressing of the Tab key to move to a non-consecutive field, or to move the cursor to a random field in the form, or to maintain the cursor at the same field even though the Tab key is pressed; thereby causing a "surprise element" to the user, and enabling the system to gauge or to estimate the true level of familiarity of the user with the screen or the application.

In some embodiments, the type of the computerized service, or the type of transaction or operation that the user is attempting to perform, may have a weight as a contributing factor when determining whether the level of familiarity indicates a genuine user or an attacker. In some embodiments, for example, the determination whether the user is a genuine (authorized) user or a cyber-attacker, may take into account one or more of the following factors: (a) whether or not the user interactions indicate that the user is very familiar with this computerized service; (b) whether or not the user interactions indicate that the user is very familiar with the particular type of transaction (e.g., wire transfer; online purchase) that the user is attempting to perform at the computerized service; (c) whether the user is "generally surprised by", or is "generally indifferent to", random or intentional modifications to the regular flow of the application or to the regular behavior of application-elements or GUI elements; (d) whether the computerized service being examined is a type of computerized service that users in general frequently visit and thus are expected to show high level of familiarity (e.g., banking website), or in contrast, a type of computerized service that users are not expected to visit frequently and thus are expected to show low level of familiarity (e.g., online vendor or wedding rings); (e) whether the particular operation that the user is attempting to perform, at the computerized service, is an operation that most users are expected to be very familiar with (e.g., reviewing paid checks in a bank account online), or is an operation that most users are expected to be less familiar with (e.g., requesting to add a power-of-attorney to a bank account).

In a demonstrative example, if the analysis of user interactions indicate that the user is very familiar with the website, and the website is a vendor of wedding rings (e.g., a transaction that a typical user performs rarely, or once in his life, or few times in his life), and if the user appears to be "surprised" (based on his user interactions) to small modifications or interference that are injected into the GUI or the flow of the service, then the user may be estimated to be a cyber-attacker. In contrast, introduction an interference to field-navigation in a checks-reviewing screen of a bank account online service, even if such introduction causes an identifiable "surprise" reaction at the user, may not lead to categorization of the user as an attacker; since many users may be highly-familiar with the checks-reviewing screen of a popular banking service. The present invention may thus allocate different weights to the above mentioned factors (a) through (e), and/or other relevant factors, in order to determine or to estimate, based on their weighted values, whether the user is an authorized user or a cyber-attacker.

Figure 3:
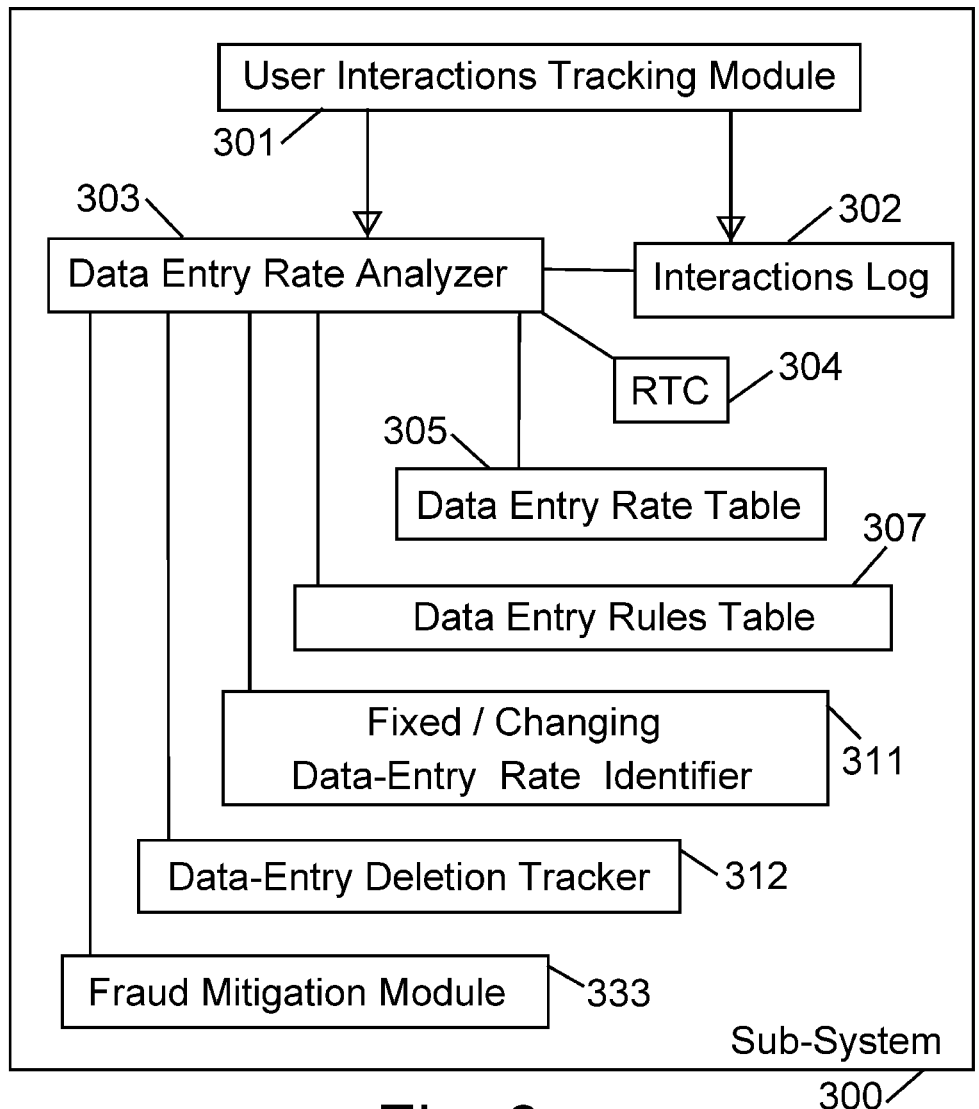
FIG. 3 is a schematic block-diagram illustration of another fraud detection sub-system, in accordance with some demonstrative embodiments of the present invention.

Reference is made to FIG. 3, which is a schematic block-diagram illustration of a fraud detection sub-system 300 in accordance with some demonstrative embodiments of the present invention. Sub-system 300 may operate to detect or to estimate, for example: fraud, fraud attempts, fraudulent computerized operations, unauthorized computerized operations, computerized operations that breach or violate a law or a regulation or policy or terms-of-use or an intended use of a service or website or application, or fraudulent activity. Sub-system 300 may further operate to distinguish or differentiate among users (or to detect fraud) based on analysis and/or estimation of the level of familiarity (or non-familiarity) of a user relative to one or more data-items or inputted-data that are entered by the user at a computerized device or towards a computerized system or computerized service. Sub-system 300 may be implemented as part of, or as a sub-module of, the fraud detection module 111 of FIG. 1B, the system 100 of FIG. 1B, the system 180 of FIG. 1A, the fraud estimator 188 of FIG. 1A, and/or other suitable systems or modules.

Sub-system 300 may comprise a user interaction tracking module 301, which may track the user interactions (e.g., keyboard presses, mouse-clicks, mouse-movements, touch-screen taps, and/or other user gestures) when the user interacts with a computerized service via an electronic device (e.g., desktop computer, laptop computer, tablet, smartphone, or the like). The user interaction tracking module 301 may observe and/or record and/or log all such user interactions, and may optionally store them in an interactions log 302 or other database or repository.

Sub-system 300 may comprise a Data Entry Rate Analyzer (DERA) 303 which may analyze, calculate and/or determine the rate or speed or velocity or frequency of data entry into each field (e.g., field in a fillable form) or other GUI element of the computerized service. DERA 303 may operate in real-time, for example, operable associated with a Real-Time Clock (RTC) 304; and/or DERA 303 may operate by analyzing freshly-stored or recently-stored or previously-stored data recorded in the interactions log 302.

In a demonstrative implementation, DERA 303 may generate, construct, update and/or populate a Data Entry Rate Table (DERT) 305; which may have structure or format similar to, for example, the demonstrative Table 6:

TABLE 6

| Field | Characters Typed | Time Period of Typing | Data Entry Rate (CPS = characters per second) | Deleted Characters |
|---|---|---|---|---|
| Username | 12 | 3.0 seconds | 4.0 CPS | 0 |
| Password | 16 | 4.1 seconds | 3.9 CPS | 0 |
| Home Address | 25 | 6.1 seconds | 4.1 CPS | 0 |
| Beneficiary Name | 15 | 3.9 seconds | 3.8 CPS | 1 |
| Beneficiary Account | 9 | 4.5 seconds | 2.0 CPS | 1 |

Table 6 may demonstrate the analyzed and stored data corresponding to a legitimate (non-attacker) user. The user may be very familiar with his own username and password, as well as his home address and the beneficiary name (e.g., for a wire transfer), and thus may have a high and generally-similar data entry rate for these fields (around 4.0 CPS or characters per second). In contrast, the legitimate user is not too familiar with the Beneficiary Account number, and he enters that data using a slower rate of only 2.0 CPS (e.g., due to the need to manually copy the data-item from a printed bill or statement or invoice). The data entry rate is not fixed and not constant, and therefore, in accordance with some embodiments of the present invention, it indicates that the user is closely familiar with the data for some fields, but is unfamiliar with the data for other fields. In accordance with some demonstrative embodiments of the present invention, this may be reinforced by analyzing the number of deletion operations that the user performed when entering each data item: for example, showing zero deletions for his most familiar fields, and showing one (or more) deletions in fields that the user is less familiar with their content.

In contrast, Table 7 demonstrates data stored and/or processed and/or analyzed, which may correspond to user interactions performed by an attacker which enters the same data-items into the same fields:

TABLE 7

| Field | Characters Typed | Time Period of Typing | Data Entry Rate (CPS = characters per second) | Deleted Characters |
|---|---|---|---|---|
| Username | 12 | 3.4 seconds | 3.5 CPS | 0 |
| Password | 16 | 4.4 seconds | 3.6 CPS | 0 |
| Home Address | 25 | 7.3 seconds | 3.4 CPS | 0 |
| Beneficiary Name | 15 | 4.4 seconds | 3.4 CPS | 0 |
| Beneficiary Account | 9 | 2.5 seconds | 3.6 CPS | 0 |

As demonstrated in Table 7, the data entry rate of this user is generally constant at around 3.5 CPS, indicating that this user is possibly an attacker that has the same level of familiarity (or non-familiarity) with all the data-items being entered, regardless of whether the data-item is of a type that the user is usually using often and can memorize easily (e.g., username) or of a type that the user rarely uses and rarely memorizes (e.g., beneficiary account number). Similarly, the Deletions analysis shows that the same degree of deletions (for example, no deletions at all) occurred during entry of all the data-items; again indicating that this is possibly an attacker who carefully copies data from a prepared sheet or file or list, and thus allowing the system to generate a cyber-attack notification or alert, and to trigger the activation of one or more fraud mitigation steps.

The DERA 303 may analyze the data of DERT 305 relative to one or more pre-defined data-entry rules, which may be stored or represented in a suitable manner or structure, for example, by utilizing a data-entry rules table 306; which may be similar to Table 8:

TABLE 8

| Data Entry Characteristic: | Indicative Of: |
|---|---|
| Generally-constant data entry rate | Attacker |
| Changing data entry rate | Legitimate User |
| No deletions | Attacker |
| Deletions below a threshold value | Attacker |
| Deletions above a threshold value | Legitimate User |

The data in Table 8 may be generated or may be defined with regard to all the fields in a form or a screen or a web-page or application-page; or with regard to a subset or group of fields within a single screen or web-page or application-page; or with regard to multiple fields that are displayed across multiple screens or multiple web-pages or multiple application-pages.

The DERA 303 may optionally be implemented by using (or may be associated with) one or more sub-modules; for example, a fixed/changing data-entry rate identifier 311, which may be responsible for tracking the data entry rate of various data items across various fields (in the same page, or across multiple pages); a data-entry deletion tracker 312, which may be responsible for tracking deletions of characters during data entry across various fields (in the same page, or across multiple pages); and/or other modules or sub-modules.

The DERA 303 and/or other such sub-modules, may trigger or may activate a fraud mitigation module 333 to perform one or more pre-defined operations based on the fraud indications that were determined; for example, to require the user to perform two-factor authentication or two-step authentication, or to require the user to actively call a telephone support line or a fraud department of the computerized service. In some implementations, the DERA 303 and/or other modules may update a fraud-score based on the possible fraud indications that were determined; and fraud mitigation operations may be triggered only when the fraud-score reaches or traverses a pre-defined threshold value.

Some embodiments of the present invention may detect, may recognize, and may then utilize for user authentication purposes or for fraud detection purposes, an analysis of user behavior with regard to particular fields or data-fields or regions of online forms or other suitable User Interface (UI) components or Graphic UI (GUI) components or elements. The analysis may pertain to, for example: various behavioral choices and UI preferences of users; handling of date entry or date field; tracking and profiling where a user clicks on a field or button as being a distinctive trait of the user; tracking post-mouse-click effect as a distinctive user trait (e.g., a user that clicks the mouse button hard, causes a greater motion of the mouse pointer during or after the click); or the like. Such behavior may be tracked by the system, and its analysis may detect user-specific characteristics that may differentiate between an authorized user of the computerized service and an attacker.

Some embodiments of the present invention may determine a user-specific trait that may assist in authenticating the user and/or in detecting an attacker, based on, for example: (a) the way in which the user typically switches between browser tabs (e.g., by clicking with the mouse on the tabs bar, or by using a keyboard shortcut such as CTRL+SHIFT); (b) the way in which the user types or enters an upper case letter or word (e.g., by clicking on CAPS lock and then typing the letter or the word, or, by holding down the SHIFT key and concurrently typing the letter); (c) the way in which the user moves between fields in an online form (e.g., by using the mouse to click on fields, or by using the TAB key to move between fields); (d) the way in which the user corrects a typographical error (e.g., by using the "Del" key or by using the "Backspace" key; by clicking consecutively several types or by doing a "sticky" click in which the key is held down for a longer time to delete several characters); (e) the way in which the user performs copy-and-paste or cut-and-paste operations (e.g., by using a keyboard shortcut such as CTRL-C, CTRL-V, CTRL-X; or by using the mouse right-click); (f) the way in which the user selects items or text (e.g., by using the mouse or using keyboard shortcuts; by double-clicking the mouse button or by mouse dragging to select); (g) the way in which the user submits a form or information (e.g., by clicking with the mouse on a Submit button displayed on the screen, or by pressing the Enter key); (h) the way in which the user scrolls a page or a list (e.g., by using the arrow keys on the keyboard; by using page-up/page-down on the keyboard; by using the Space Bar to scroll to the next page in some applications or in some websites; by using the scroll wheel of the mouse; by using the on-screen scroll bar; by using a scroll bar integrated in a touch-pad); (i) the way in which the user enters numeric data (e.g., by using the numeric pad, or the line of number keys at the top of the keyboard); and/or other user-specific traits that may be extracted or learned from observing repeated behavior and interaction of a user with an application or website or computerized service.

Some embodiments of the present invention may extract user-specific traits by observing the way in which the user typically enters a date, or enters date data. For example, the system may detect that a particular user typically enters a date by typing the numeric values on the keypad, and not on the top row of the keyboard (or vice versa); or, that a particular user enters the slash character "/" by using the keyboard and not the numeric pad (or vice versa); or that a particular user moves between date fields using the TAB key and not using a mouse click (or vice versa); or that a particular user typically uses a mouse to expose a drop-down mini-calendar matrix representation and in order to browse such mini-calendar and in order to click and select a date in the mini-calendar; or the like. These observations may be used by the system to establish a user-specific interaction trait or behavioral trait, which may subsequently be used to detect an attacker that behaves or interacts differently from the established user-specific traits of the legitimate user, when attempting to operate the online account of the legitimate user (e.g., the attacker posing as the legitimate user, during or after gaining access to the online account or to the computerized service by using the credentials of the legitimate user). Accordingly, some embodiments of the present invention may be used in order to automatically identify that a user (e.g., an attacker or a "fraudster") is attempting to pose as (or impersonate, or "spoof") another user (e.g., the "real" user or the genuine user).

Figure 4:
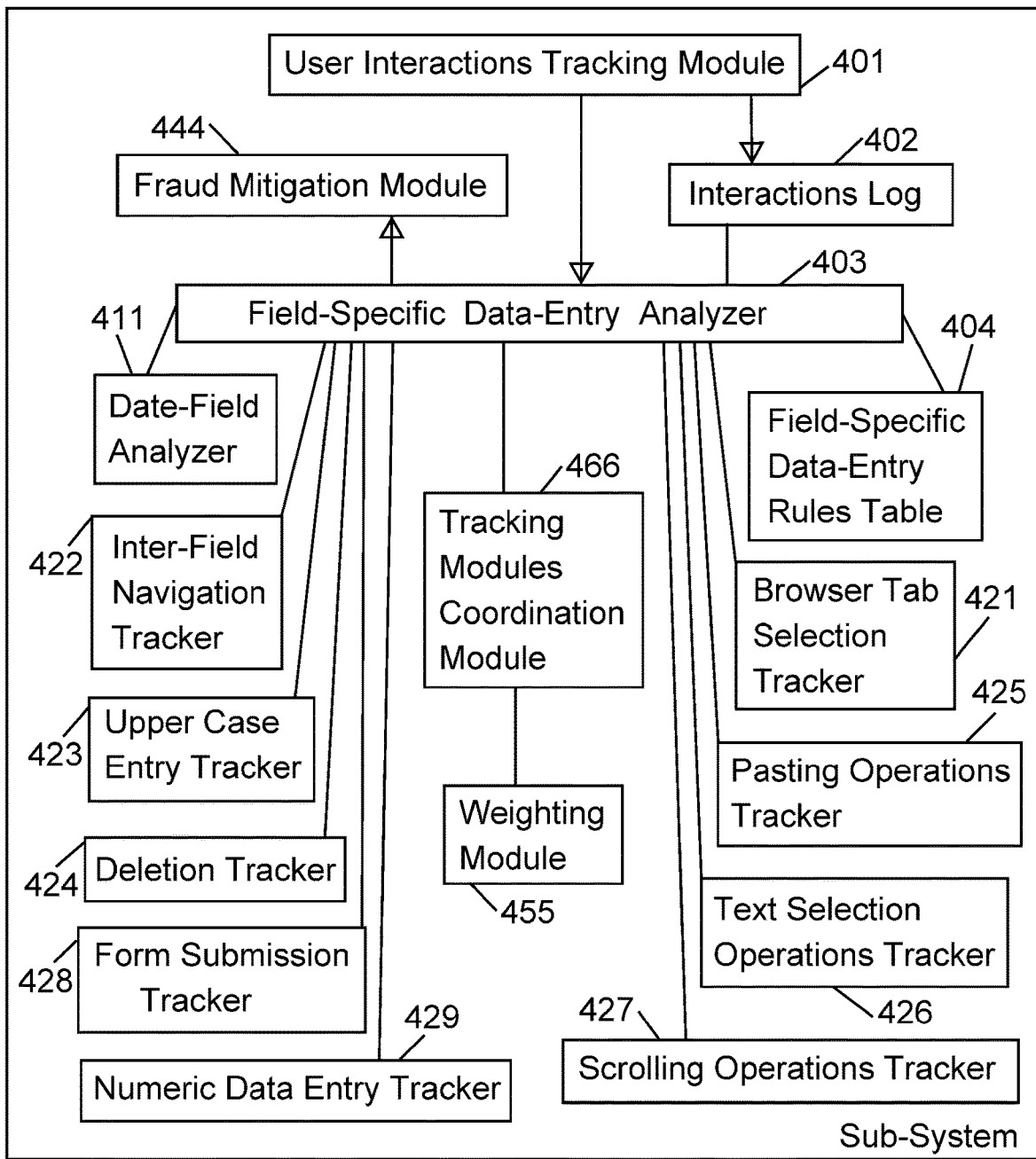
FIG. 4 is a schematic block-diagram illustration of still another fraud detection sub-system, in accordance with some demonstrative embodiments of the present invention.

Reference is made to FIG. 4, which is a schematic block-diagram illustration of a fraud detection sub-system 400 in accordance with some demonstrative embodiments of the present invention. Sub-system 400 may operate to detect or to estimate, for example: fraud, fraud attempts, fraudulent computerized operations, unauthorized computerized operations, computerized operations that breach or violate a law or a regulation or policy or terms-of-use or an intended use of a service or website or application, or fraudulent activity. Sub-system 400 may further operate to distinguish or differentiate among users (or to detect fraud) based on analysis and/or estimation of the user behavior with regard to a particular field, or a particular type-of-field, or a particular type of data-item, that the user interacts with (or inputs data at), via a computerized device or towards a computerized system or computerized service. Sub-system 400 may be implemented as part of, or as a sub-module of, the fraud detection module 111 of FIG. 1B, the system 100 of FIG. 1B, the system 180 of FIG. 1A, the fraud estimator 188 of FIG. 1A, and/or other suitable systems or modules.

Sub-system 400 may comprise a user interaction tracking module 401, which may track the user interactions (e.g., keyboard presses, mouse-clicks, mouse-movements, touch-screen taps, and/or other user gestures) when the user interacts with a computerized service via an electronic device (e.g., desktop computer, laptop computer, tablet, smartphone, or the like). The user interaction tracking module 301 may observe and/or record and/or log all such user interactions, and may optionally store them in an interactions log 402 or other database or repository.

Field-specific data-entry analyzer 403 may track and/or analyze the manner in which the user enters data into (or interacts with) a particular field in a form; or a particular type-of-field in a form (e.g., Date field; username field; password field; beneficiary name field; beneficiary account number field; bank routing number field; or the like). Field-specific data-entry analyzer 403 may analyze user interactions, in real time and/or by reviewing the logged data that is stored in interactions log 402. Field-specific data-entry analyzer 403 may analyze such data in view of one or more pre-defined rules, which may optionally be stored or represented via a field-specific data-entry rules table 404. Field-specific data-entry analyzer 403 may generate one or more insights, for example, indication of fraud, indication of legitimate user, indication of possible fraud, or the like. Such generated indications may be used in order to construct or update a fraud-score associated with a current user or with a communication session or with a transaction; and/or may be used in order to trigger or activate a Fraud Mitigation Module 444 (e.g., requiring the user to use two-factor authentication, or to contact the fraud department by phone).

In a demonstrative implementation, the field-specific data-entry analyzer 403 may comprise, or may be associated with, one or more modules or sub-modules; for example, a Date Field analyzer 411 which may track the ongoing and/or past entry of date data to the system by a user. For example, the Date Field analyzer 411 may detect that the user who is currently logged in to a banking account, had always selected a date for wire transfer by clicking with the mouse on a drop-down mini-calendar matrix and selecting with the mouse a date in the mini-calendar; whereas, the same user is now entering the Date data (or, has just finished entering the Date data) in another manner, for example, by manually typing eight (or ten) characters via a keyboard (e.g., in the format of YYYY-MM-DD or in the format of YYYY/MM/DD, or the like). Accordingly, the Date Field analyzer 411 may trigger an indication of possible fraud, namely, that the current user is actually an attacker who enters the date manually via a keyboard, in contrast with a legitimate user who had entered the date in all previous sessions (or transactions) by selecting a date with the mouse from a drop-down mini-calendar matrix. Similarly, the Date Field analyzer 411 may detect an attacker who is entering the date via manual typing in the format of YYYY/MM/DD having the Slash character as separator; whereas all previous communication sessions of that user had receive user input of dates in the structure of YYYY-MM-DD having the Minus character as separator; thereby triggering a possible fraud indication for the current session or transaction.

Similarly, sub-system 400 may comprise other modules or sub-modules, which may analyze the tracked or recorded user interactions, in order to identify other user-specific behavior which may indicate that a current user does not match a pattern of usage that was exhibited in prior communication sessions (or usage sessions, or logged-in sessions, or transactions) of the same (e.g., currently logged-in) user.

For example, a Browser Tab Selection tracker 421 may track and/or identify the method(s) that the user utilizes in order to switch among Browser Tabs; and may compare the currently-utilized method(s) to previously-tracked user method(s) of performing this task by the same user (e.g., on the same user-account). Such methods may include, for example, (a) using a keyboard (e.g., CTRL+SHIFT); (b) using the mouse (or other pointer or pointing-device) to click on a browser tab in order to switch to it. Other methods may be used, tracked, and monitored; and may be utilized in order to differentiate among users, or among a legitimate user and an attacker. In some embodiments, utilization of a method that is different from the method used in the most-recent K interactions or sessions (e.g., most recent 3 or 5 or 10 usage sessions), may indicate that the current user is an attacker.

For example, an Inter-Field Navigation tracker 422 may track and/or identify the method(s) that the user utilizes in order to move or navigate or switch among Fields of a single form or screen or web-page; and may compare the currently-utilized method(s) to previously-tracked user method(s) of performing this task by the same user (e.g., on the same user-account). Such methods may include, for example, (a) using a keyboard (e.g., pressing TAB to move to the next field, or pressing SHIFT+TAB to move to the previous field); (b) using the mouse (or other pointer or pointing-device) to click on a field in order to switch to it. Other methods may be used, tracked, and monitored; and may be utilized in order to differentiate among users, or among a legitimate user and an attacker. In some embodiments, utilization of a method that is different from the method used in the most-recent K interactions or sessions (e.g., most recent 3 or 5 or 10 usage sessions), may indicate that the current user is an attacker.

For example, an Upper Case entry tracker 423 may track and/or identify the method(s) that the user utilizes in order to enter or to input Upper Case letter(s) and/or word(s); and may compare the currently-utilized method(s) to previously-tracked user method(s) of performing this task by the same user (e.g., on the same user-account). Such methods may include, for example, (a) pressing and depressing the CAPS lock, and then typing the letter or word as upper case; (b) holding down the SHIFT key and concurrently typing the letter(s) as upper case. Other methods may be used, tracked, and monitored; and may be utilized in order to differentiate among users, or among a legitimate user and an attacker. In some embodiments, utilization of a method that is different from the method used in the most-recent K interactions or sessions (e.g., most recent 3 or 5 or 10 usage sessions), may indicate that the current user is an attacker.

For example, a Deletion tracker 424 may track and/or identify the method(s) that the user utilizes in order to delete character(s) or words (or other text portions) in a form or page or screen or application; and may compare the currently-utilized method(s) to previously-tracked user method(s) of performing this task by the same user (e.g., on the same user-account). Such methods may include, for example: (a) using the "Del" key; (b) using the "Backspace" key; (c) pressing consecutively several types in discrete key-presses, in contrast to performing a "sticky" or continuous pressing in which the key is held down for a longer time to delete several characters; (d) using the mouse (or other pointer or pointing-device) for selecting a word or a sentence or a text-portion with the mouse, and then using the mouse (or other pointer or pointing-device) to perform a Cut operation; (e) using the mouse (or other pointer or pointing-device) for selecting a word or a sentence or a text-portion with the mouse, and then using the keyboard (e.g., the Del key, or the Backspace key, or a keyboard shortcut such as CTRL-X) to remove the selected portion. Other methods may be used, tracked, and monitored; and may be utilized in order to differentiate among users, or among a legitimate user and an attacker. In some embodiments, utilization of a method that is different from the method used in the most-recent K interactions or sessions (e.g., most recent 3 or 5 or 10 usage sessions), may indicate that the current user is an attacker.

For example, a Pasting Operations tracker 425 may track and/or identify the method(s) that the user utilizes in order to cut-and-paste or copy-and-paste data items (e.g., text, numbers) in a form or page or screen or application; and may compare the currently-utilized method(s) to previously-tracked user method(s) of performing this task by the same user (e.g., on the same user-account). Such methods may include, for example: (a) using a keyboard shortcut such as CTRL-C, CTRL-V, CTRL-X; (b) using the mouse right-click. Other methods may be used, tracked, and monitored; and may be utilized in order to differentiate among users, or among a legitimate user and an attacker. In some embodiments, utilization of a method that is different from the method used in the most-recent K interactions or sessions (e.g., most recent 3 or 5 or 10 usage sessions), may indicate that the current user is an attacker.

For example, a Text Selection Operations tracker 426 may track and/or identify the method(s) that the user utilizes in order to select (or to "paint" as selected) text or data-items in a form or page or screen or application; and may compare the currently-utilized method(s) to previously-tracked user method(s) of performing this task by the same user (e.g., on the same user-account). Such methods may include, for example: (a) using the mouse; (b) using keyboard shortcuts; (c) double-clicking the mouse button to select a word, in contrast to dragging the mouse while clicking it to select a word. Other methods may be used, tracked, and monitored; and may be utilized in order to differentiate among users, or among a legitimate user and an attacker. In some embodiments, utilization of a method that is different from the method used in the most-recent K interactions or sessions (e.g., most recent 3 or 5 or 10 usage sessions), may indicate that the current user is an attacker.

For example, a Scrolling Operations tracker 427 may track and/or identify the method(s) that the user utilizes in order to scroll through a form or list or menu or page or screen or application; and may compare the currently-utilized method(s) to previously-tracked user method(s) of performing this task by the same user (e.g., on the same user-account). Such methods may include, for example: (a) using the mouse to click on scrolling arrows; (b) using the mouse to drag a scroll-bar; (c) using a mouse-wheel to scroll; (d) using keyboard shortcuts such as Arrow Up, Arrow Down, Page-Up, Page-Down, Home, End; (e) using application-specific keyboard shortcuts, such as the Space Bar in some browsers or applications; (f) using a vertical scroll-line or scroll-regions that is incorporated into some touch-pads (e.g., located at the right side of a touch-pad of a laptop computer). Other methods may be used, tracked, and monitored; and may be utilized in order to differentiate among users, or among a legitimate user and an attacker. In some embodiments, utilization of a method that is different from the method used in the most-recent K interactions or sessions (e.g., most recent 3 or 5 or 10 usage sessions), may indicate that the current user is an attacker.

For example, a Form Submission tracker 428 may track and/or identify the method(s) that the user utilizes in order to submit or "send" a form or query or request or command; and may compare the currently-utilized method(s) to previously-tracked user method(s) of performing this task by the same user (e.g., on the same user-account). Such methods may include, for example: (a) using the mouse to click on a "submit" button; (b) pressing the Enter or Return key on the keyboard. Other methods may be used, tracked, and monitored; and may be utilized in order to differentiate among users, or among a legitimate user and an attacker. In some embodiments, utilization of a method that is different from the method used in the most-recent K interactions or sessions (e.g., most recent 3 or 5 or 10 usage sessions), may indicate that the current user is an attacker.

For example, a Numeric Data Entry tracker 429 may track and/or identify the method(s) that the user utilizes in order to enter numeric data or numerical values (e.g., monetary amount; telephone number; zip code; bank account number). Such methods may include, for example: (a) using a numeric key-pad that some keyboards include; (b) using the horizontal row of digit keys that appears at the top of a QWERTY keyboard. Other methods may be used, tracked, and monitored; and may be utilized in order to differentiate among users, or among a legitimate user and an attacker. In some embodiments, utilization of a method that is different from the method used in the most-recent K interactions or sessions (e.g., most recent 3 or 5 or 10 usage sessions), may indicate that the current user is an attacker.

Other suitable tracking/detection modules may be used. In some embodiments, the variety of modules may be used in an aggregate manner; for example, utilizing a Tracking Modules coordination module 466 which may ensure that only if two or more modules (or, at least K modules) report that a possible fraud is taking place (or took place), then (and only then) fraud alert may be triggered and fraud detection may be declared. In some embodiments, a weighting module 455 may optionally be used, in order to allocate different weights to the indications produced by the various modules, and in order to produce a weighted fraud-score; and if the fraud-score is greater than a pre-defined threshold value then fraud may be declared and/or fraud mitigation steps may be triggered or activated.

The present invention may differentiate or distinguish between the genuine (human) user, and a robot or a machine-operable module or function (e.g., implemented as a computer virus, a Trojan module, a cyber-weapon, or other malware) which attempts to automatically imitate or emulate or simulate movement of a cursor or other interaction with a touch-screen. For example, false identity created by automated malware may be detected by the present invention as such automated malware may lack the characterization of human (e.g., the manual activity having the particular user-specific traits, as described above).

The present invention may operate and may provide an efficient biometric or user-authentication modality, without capturing, storing, or otherwise identifying any Personally Identifiable Information (PII). For example, the present invention may be used to distinguish between a genuine user and a fraudster, without knowing any PPI of the genuine user and/or of the fraudster.

The present invention may detect correlations and extract user-specific traits based on passive data collection and/or based on active challenges. In passive data collection, the device may detect that the user is performing a particular operation (e.g., a vertical scroll gesture), and may further detect that performing this gesture affects in a user-specific way the acceleration and/or the orientation/rotation of the mobile device. In an active challenge, the device (or an application or process thereof) may actively present a challenge to the user, such as, a requirement to the user to perform horizontal scrolling, in order to capture data and detect user-specific correlation(s). The active challenge may be hidden or may be unknown to the user, for example, implemented by creating a Graphical User Interface (GUI) that requires the button to scroll in order to reach a "submit" button or a "next" button or a "continue" button, thereby "forcing" the user to unknowingly perform a particular user-gesture which may be useful for correlation detection or for extraction of user-specific traits, as described. Alternatively, the active challenge may be known to the user, and may be presented to the user as an additional security feature; for example, by requesting the user to drag and drop an on-screen object from a first point to a second point, as an action that may be taken into account for confirming user identity.

Some embodiments of the present invention may be implemented, for example, as a built-in or integrated security feature which may be a component or a module of a system or device, or may be a downloadable or install-able application or module, or plug-in or extension; or as a module of a web-site or web-page, or of a client-server system or a "cloud computing" system; or as machine-readable medium or article or memory unit able to store instructions and/or code which, when executed by the mobile device or by other suitable machine (e.g., a remote server, or a processor or a computer) cause such machine to perform the method(s) and/or operations described herein. Some units, components or modules, may be implemented externally to the user device, may be implemented in a remote server, a web server, a website or webpage, a "cloud computing" server or database, a client/server system, a distributed system, a peer-to-peer network or system, or the like.

The present invention may be used in conjunction with various suitable devices and systems, for example, various devices that have a touch-screen; an ATM; a kiosk machine or vending machine that has a touch-screen; a touch-keyboard; a system that utilizes Augmented Reality (AR) components or AR glasses (e.g., Google Glass); a device or system that may detect hovering gestures that do not necessarily touch on the screen or touch-screen; a hovering screen; a system or device that utilize brainwave analysis or brainwave control in which the user's brainwaves are captured or read and the user's brain may directly control an application on the mobile device; and/or other suitable devices or systems.

In some embodiments, the terms "rapidly" or "fast" or similar terms, may comprise, for example: at a rate or at a speed that is greater than threshold value; at a rate or at a speed that is greater than an average or a median or a most-frequent rate or speed that is associated with one or more other users (e.g., the general population; a selected group of users out of the general populations; a group of users of the same computerized service; a group of users of the particular type of transaction that is being reviewed).

In some embodiments, the term "slowly" or similar terms, may comprise, for example: at a rate or at a speed that is smaller than threshold value; at a rate or at a speed that is smaller than an average or a median or a most-frequent rate or speed that is associated with one or more other users (e.g., the general population; a selected group of users out of the general populations; a group of users of the same computerized service; a group of users of the particular type of transaction that is being reviewed).

In accordance with some embodiments of the present invention, a method may comprise: determining whether a user, who utilizes a computing device to interact with a computerized service, is (A) an authorized user, or (B) an attacker posing as the authorized user and gaining unauthorized access to the computerized service; wherein the determining comprises: tracking user interactions with the computerized service via an input unit of the computing device; analyzing the user interactions with the computerized service; based on analysis of the user interactions with the computerized service, deducing at least one of: (i) changes in data-entry rate of said user, and (ii) level of familiarity of said user with said computerized service; based on said deducing, determining whether said user is (A) an authorized user, or (B) an attacker posing as the authorized user and gaining unauthorized access to the computerized service.

In some embodiments, the method may comprise: monitoring a rate of manual data entry by said user into a form of said computerized service; if said rate of manual data entry is generally constant for all fields in said form, then determining that said user is an attacker posing as the authorized user.

In some embodiments, the method may comprise: calculating a typing speed of data entry by said user, for each field in a form of said computerized service; if the typing speed of data entry by said user, is generally constant for all fields in said form of the computerized service, then determining that said user is an attacker posing as the authorized user.

In some embodiments, the method may comprise: monitoring a rate of manual data entry by said user into a form of said computerized service; if (a) the rate of manual data entry by said user is generally constant for a first group of fields in said form, and (b) the rate of manual data entry by said user is generally varying for a second group of fields in said form, then determining that said user is an authorized user of the computerized service.

In some embodiments, the method may comprise: monitoring a rate of manual data entry by said user into a form of said computerized service; monitoring deletion operations during manual data entry by said user into said form of said computerized service; based on a combination of (a) the rate of manual data entry, and (b) utilization or non-utilization of deletion operations during manual data entry, determining whether said user is (A) an authorized user, or (B) an attacker posing as the authorized user and gaining unauthorized access to the computerized service.

In some embodiments, the method may comprise: (a) monitoring a rate of manual data entry by said user into a form of said computerized service; (b) determining that the rate of manual data entry by said user into said form is generally constant across all fields of said form; (c) monitoring deletion operations during manual data entry by said user into said form of said computerized service; (d) determining that the number of deletion operations during manual data entry by said user into said form is smaller than a threshold value; (e) based on a combination of the determinations of step (b) and step (d), determining that said user is an attacker posing as the authorized user and gaining unauthorized access to the computerized service.

In some embodiments, the method may comprise: defining a first field, in a form of said computerized service, as a field that users are familiar with and type data therein rapidly; defining a second field, in said form of said computerized service, as a field that users are unfamiliar with and type data therein slowly; detecting that a rate of manual data entry by said user into the first field, is generally similar to the rate of manual data entry by said user into the second field; based on said detecting, determining that said user is an attacker posing as the authorized user and gaining unauthorized access to the computerized service.

In some embodiments, the method may comprise: defining a first field, in a form of said computerized service, as a field that users are familiar with and type data therein rapidly; defining a second field, in said form of said computerized service, as a field that users are unfamiliar with and type data therein slowly; detecting that said user enters data slowly into said first field that was defined as a field that users are familiar with and type data therein rapidly; based on said detecting, determining that said user is an attacker posing as the authorized user and gaining unauthorized access to the computerized service.

In some embodiments, the method may comprise: defining a first field, in a form of said computerized service, as a field that users are familiar with and type data therein rapidly; defining a second field, in said form of said computerized service, as a field that users are unfamiliar with and type data therein slowly; detecting that said user enters data rapidly into said second field that was defined as a field that users are unfamiliar with and type data therein slowly; based on said detecting, determining that said user is an attacker posing as the authorized user and gaining unauthorized access to the computerized service.

In some embodiments, the method may comprise: based on tracking of user interactions via the input unit of said computing device, estimating an actual level of familiarity of said user with a data-item that said user enters into a particular field of a form of said computerized service; based on a field-type of said particular field, determining an expected level of familiarity of authorized users with data-items that they enter into said particular field; comparing between (a) the actual level of familiarity of said user with said data-item entered into said particular field, and (b) the expected level of familiarity that characterizes authorized users who enter data into said particular field; if said comparing indicates a mismatch between the actual level of familiarity and the expected level of familiarity, then determining that said user is an attacker posing as the authorized user.

In some embodiments, the method may comprise: monitoring user interactions of said user with the computerized service, and detecting that said user deleted one or more characters when entering a data-item into a particular field in a form of said computerized service; determining that said particular field is a field that most authorized users are highly familiar with, and that said particular field is a field that most authorized users do not make mistakes when entering data therein; based on said, determining that said user is an attacker posing as the authorized user.

In some embodiments, the method may comprise: monitoring user interactions of said user with the computerized service, and detecting that said user exclusively performed copy-and-paste operations to enter data-items into all fields of a form of said computerized service; based on said detecting, determining that said user is an attacker posing as the authorized user.

In some embodiments, the method may comprise: defining a first field, in a form of said computerized service, as a field that authorized users typically enter data therein by manual character-by-character typing; defining a second field, in said form of said computerized service, as a field that authorized users typically enter data therein by performing copy-and-paste operations; detecting that said user enters data into said first field by performing a copy-and-paste operation instead of by manual character-by-character typing; based on said detecting, determining that said user is an attacker posing as the authorized user and gaining unauthorized access to the computerized service.

In some embodiments, the method may comprise: defining a first group of fields, in a form of said computerized service, as a group of fields that authorized users typically enter data therein by manual character-by-character typing; defining a second group of fields, in said form of said computerized service, as a group of fields that authorized users typically enter data therein by performing copy-and-paste operations; monitoring data entry methods that said user utilizes when said user populates data into fields of said form; detecting that said user performed copy-and-paste operations in at least a first particular field of said form; detecting that said user performed manual character-by-character typing of data in at least a second particular field of said form; if said first particular field belongs to said second group of fields, and if said second particular field belongs to said first group of fields, then determining that said user is an attacker.

In some embodiments, the method may comprise: defining a first group of fields, in a form of said computerized service, as a group of fields that authorized users typically enter data therein by manual character-by-character typing; defining a second group of fields, in said form of said computerized service, as a group of fields that authorized users typically enter data therein by performing copy-and-paste operations; monitoring data entry methods that said user utilizes when said user populates data into fields of said form; detecting that said user performed copy-and-paste operations in at least a first particular field of said form; detecting that said user performed manual character-by-character typing of data in at least a second particular field of said form; if said first particular field belongs to said first group of fields, and if said second particular field belongs to said second group of fields, then determining that said user is an authorized user.

In some embodiments, the method comprises: monitoring user interactions of said user with a date field in a form of said computerized service; detecting that in a current usage session by said user, said user enters a date into said date field by selecting a date from a drop-down mini-calendar matrix; determining that in a set of previous usage sessions of said user, the user entered dates into date fields via manual character-by-character typing; based on said detecting and said determining, determining that said user is an attacker posing as the authorized user.

In some embodiments, the method may comprise: monitoring user interactions of said user with a form having multiple fields of said computerized service, and tracking whether said user moves a cursor among fields of said form by utilizing a keyboard or by utilizing a pointing device; detecting that in a current usage session by said user, said user moves the cursor among fields of said form by utilizing the keyboard and not the pointing device; determining that in a set of previous usage sessions of said user, said user moved the cursor among fields of said form by utilizing the pointing device and not the keyboard; based on said detecting and said determining, determining that said user is an attacker posing as the authorized user.

In some embodiments, the method may comprise: monitoring user interactions of said user with a form having multiple fields of said computerized service, and tracking whether said user moves a cursor among fields of said form by utilizing a keyboard or by utilizing a pointing device; detecting that in a current usage session by said user, said user moves the cursor among fields of said form by utilizing the pointing device and not the keyboard; determining that in a set of previous usage sessions of said user, said user moved the cursor among fields of said form by utilizing the keyboard and not the pointing device; based on said detecting and said determining, determining that said user is an attacker posing as the authorized user.

In some embodiments, the method may comprise: monitoring user interactions of said user with a form having multiple fields of said computerized service, and tracking whether said user submits the form by utilizing a pointing device to click on a Submit button or by pressing Enter on a keyboard; detecting that in a current usage session by said user, said user submits the form by pressing Enter on the keyboard; determining that in a set of previous usage sessions of said user, said user submitted forms by utilizing the pointing device to click on the Submit button; based on said detecting and said determining, determining that said user is an attacker posing as the authorized user.

In some embodiments, the method may comprise: monitoring user interactions of said user with a form having multiple fields of said computerized service, and tracking whether said user submits the form by utilizing a pointing device to click on a Submit button or by pressing Enter on a keyboard; detecting that in a current usage session by said user, said user submits the form by utilizing the pointing device to click on the Submit button; determining that in a set of previous usage sessions of said user, said user submitted forms by pressing Enter on the keyboard; based on said detecting and said determining, determining that said user is an attacker posing as the authorized user.

In some embodiments, the method may comprise: monitoring user interactions of said user with a form having multiple fields of said computerized service; with regard to a particular field in said form, said particular field associated with at least a first engagement manner and a second data-entry manner, tracking whether said user engages with said particular field by utilizing the first or the second data-entry manner; detecting that in a current usage session by said user, said user engaged with said particular field by utilizing said first data-entry manner; determining that in a set of previous usage sessions of said user, said user engaged with said particular field by utilizing said second data-entry manner; based on said detecting and said determining, determining that said user is an attacker posing as the authorized user.

In some embodiments, the method may comprise: (a) defining a multiple-screen account-creation process for creating a new account associated with the computerized service; (b) presenting a first, fixed, screen of said multiple-screen account creation process, and measuring characteristics of user interactions in said first screen; (c) shuffling the order of remaining screens of said multiple-screens account-creation process, by presenting at least one out-of-order screen earlier relative to a pre-defined sequence of said remaining screens; (d) measuring characteristics of user interaction in said at least one out-of-order screen of the account creation process; (e) determining a change between: (A) the characteristics of user interactions measured in step (b) during the first fixed screen, and (B) the characteristics of user interactions measured in step (d) during the at least one out-of-order screen; (f) based on the changed determined in step (e), determining that said user is an attacker.

In some embodiments, the method may comprise: (a) defining a multiple-screen account-creation process for creating a new account associated with the computerized service; (b) presenting a first, fixed, screen of said multiple-screen account creation process, and measuring characteristics of user interactions in said first screen; wherein said first, fixed, screen is presented with identical content to all users creating new accounts; (c) pseudo-randomly changing a content of a second screen of said multiple-screens account-creation process; (d) measuring characteristics of user interaction in said second screen of the account creation process; (e) comparing between: (A) the characteristics of user interactions measured in step (b) during the first fixed screen of the account-creation process, and (B) the characteristics of user interactions measured in step (d) during the second screen of the account-creation process; and determining that the user interactions in the second screen of the account-creation process exhibit user delays; (f) based on the determining of step (e), determining that said user is an attacker.

In some embodiments, the method comprises: monitoring user interactions of said user with a form having multiple fields of said computerized service; tracking deletion operations performed by said user, in at least one of the following fields: username field, password field, first name field, last name field; detecting that said user performed at least one deletion operation during entry of data into at least one of the following fields: username field, password field, first name field, last name field; based on said detecting, determining that said user is an attacker.

Modules, elements, systems and/or sub-systems described herein may be implemented by using hardware components and/or software modules; for example, utilizing a processor, a controller, an Integrated Circuit (IC), a logic unit, memory unit, storage unit, input unit, output unit, wireless modem or transceiver, wired modem or transceiver, internal or external power source, database or data repository, Operating System (OS), drivers, software applications, or the like. Some embodiments may utilize client/server architecture, distributed architecture, peer-to-peer architecture, and/or other suitable architectures; as well as one or more wired and/or wireless communication protocols, links and/or networks.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

In accordance with some embodiments of the present invention, a method comprises: while a user of an electronic device is filling-out fields in a fillable form of a computerized service via an electronic device, tracking user interactions of said user via an input unit of said electronic device, performing: determining whether said is either (A) a legitimate human user who legitimately utilizes his true identity, or (B) a human attacker that poses as the legitimate human user, based cumulatively on: (i) a detection of whether said user performed manual typing of data character-by-character or performed copy-and-paste operations, and also (ii) a detection of whether said user manually typed data without performing any typographical error, and also (iii) a detection of whether said user manually typed data, in a particular field of said fillable form, at a speed that is greater than a pre-defined threshold value; and, if determination (B) is reached, then: blocking an attempt of said user to perform operations at said computerized service.

In some embodiments, the system of the present invention monitors the input-unit interactions and/or the input-unit gestures (movements, clicks, taps, keystrokes, or the like), that the user performs via one or more input-units (mouse, keyboard, keypad, touch-screen, or the like) of an electronic device (computer, desktop computer, laptop computer, smartphone, tablet, smart-watch, or the like). For example, the user is accessing an online form or web-site or web-page or "app" or application, of a banking entity or a financial institution or a retailer or an online vendor. For example, the user is accessing and entering data into the "perform a wire transfer" page or form in a banking website or in a banking mobile app; or, the user is accessing and entering data into a "place your order" page or form in a retailer website or retailer mobile app.

The system of the present invention utilizes a client-side monitoring unit or monitoring module or tracking unit or tracking unit, to monitor, record, capture, track and/or log, the input-unit interactions and/or gestures that are performed by the user; for example, tracking and logging that the user "dragged the on-screen-pointer 170 pixels to the left", or that "the user clicked on the on-screen Submit button by using the left button of the touch-pad of the laptop", or that "the user navigated from the Check Your Balance page to the Perform Wire Transfer page by utilizing a keyboard shortcut and not by clicking on an on-screen link or GUI element", or the like.

The system monitors and collects the data, and further collects the particular timing or time-points in which each user-interaction started and/or ended, and/or the particular time-length that each such user-interaction occupied. For example, the system tracks and logs that the user "dragged the on-screen-pointer 180 pixels to the left and this took him 0.76 seconds", or that "the user clicked on the on-screen Submit button by using the left button of the touch-pad of the laptop and this operation was performed 1.45 seconds after the user has landed in the current page", or that "the user navigated from the Check Your Balance page to the Perform Wire Transfer page by utilizing a keyboard shortcut and not by clicking on an on-screen link or GUI element, and the keyboard shortcut was performed 0.9 seconds after the user was presented with his current bank account balance", or the like.

The system performs monitoring, tracking and capturing of such user-gestures by one or more suitable implementations. In some embodiments, for example, a web-page or a web-site or an "app" (mobile application) of a bank or a retailer, includes an additional script or code or program-code or other element, such as code written in JavaScript and/or HTML5 and/or CSS, able to monitor and/or capture such user interactions. In other embodiments, the monitoring and/or tracking is implemented as a browser extension, or a browser plug-in, or a browser add-on, that is installed as an addition to a conventional web-browser. In still other embodiments, the monitoring and/or tracking is implemented as a stand-alone web-browser; for example, a particular retailer or a particular bank may provide its customers a dedicated, tailored, browser application that tracks the user's input-unit interactions and gestures. In yet other embodiments, the monitoring and/or tracking is implemented as a stand-alone application or mobile app; example, a particular retailer or a particular bank may provide its customers a dedicated, tailored, mobile app or desktop app, that tracks the user's input-unit interactions and gestures as part of providing access for the user to one or more information-items or features or services that are provided by the bank or the retailer. In still other embodiments, the monitoring and/or tracking is implemented as part of a secure Operating System (OS), or as an additional driver or a kernel component, which performs low-level monitoring of such interactions, in order to enable applications or online services to provide increased security to customers.

The monitored and/or logged and/or collected data is stored locally in the end-user device; and/or is transmitted or transferred or uploaded to a remote server, such as a remote server of the bank or the retailer, or to a remote server of a trusted third-party that provides security services to customers, to banks and/or to retailers. The data is analyzed and processed, for example, locally in the end-user device, and/or remotely at such remote server, by one or more data analysis units or modules, or one or more processing units or modules.

In some embodiments, the data is analyzed in quotient or in segments. For example, in one embodiment, data that is collected within, or is associated with, the filling of one single online form by one particular user, is regarded as a discrete batch of data and is analyzed. In another embodiment, data that is collected within, or is associated with, the filling of one single web-page by one particular user, is regarded as a discrete batch of data and is analyzed. In yet another embodiment, data that is collected within, or is associated with, the filling of multiple web-pages (or multiple forms) that are pre-defined as belonging to a single transaction (e.g., multiple forms of a "perform wire transfer"

transaction; or, multiple web-pages of a "check-out now" transaction), is regarded as a discrete batch of data and is analyzed. In still other embodiments, data that is collected within, or is associated with, an entire Usage Session of a particular user (e.g., from the time the user logged-in until that user logged-out), is regarded as a discrete batch of data and is analyzed. In some embodiments, the system may be configured by an administrator, to indicate the level of granularity in which collected data is regarded as a batch of data that should be analyzed as a single batch.

The batch of data that represents the monitored input-unit(s) interactions, is analyzed by the system in order to determine, for example, whether (I) the user is a cyber-attacker, or (II) the user is a non-attacker legitimate user. The analysis may be performed based on, or by using, one or more pre-defined threshold values for comparison; a range of values for comparison; a set of K conditions or statements, whereas if at least N our of those K conditions or statements hold true (with regard to the analyzed batch of data) then a determination is made (e.g., a cyber-attacker determination is made; or, a non-attacker determination is made); a look-up table, in which each row enumerates a set of values and/or ranges and/or conditions, with an indication of the corresponding determination (attacker or non-attacker) for each such row in the look-up table; and/or other suitable comparing mechanisms, matching mechanisms, lookup mechanisms, or the like.

In some embodiments, an Attack-Relatedness Score may be constructed and updated for each such batch of data. For example, the Score is initiated with a value of zero; the system analyzes the batch of data in view of N rules or conditions or checks that the system performs (e.g., as demonstrated herein); and for each condition that or statement that is found to hold true, the system adds a particular pre-defined value to the Score (e.g., the value to be added being pre-defined in association with each such statement or condition).

In some embodiments, the determination may be based at least, or may take into account at least: whether the inspected batch of data of input-unit interactions, of the user whose data is being inspected, indicates that the user: (i) used at least one time at least one keyboard shortcut (such as, CTRL+V), or (II) did not use any keyboard shortcut. For example, if statement (i) holds true, then the system adds 5 to the Attack-Relatedness Score of this batch of data.

In some embodiments, the determination may be based at least, or may take into account at least: whether the inspected batch of data of input-unit interactions, of the user whose data is being inspected, indicates that the user: (i) used at least K times at least one keyboard shortcut (such as, CTRL+C), or (II) did not use any keyboard shortcut for at least K times. For example, if statement (i) holds true, then the system adds 7 to the Attack-Relatedness Score of this batch of data.

In some embodiments, the determination may be based at least, or may take into account at least: whether the inspected batch of data of input-unit interactions, of the user whose data is being inspected, indicates that the user: (i) used at least N different types of keyboard shortcuts (such as, CTRL+V being a first type; and CTRL-C being a second type), or (II) did not meet this criterion. For example, if statement (i) holds true, then the system adds 12 to the Attack-Relatedness Score of this batch of data.

In some embodiments, the determination may be based at least, or may take into account at least: whether the inspected batch of data of input-unit interactions, of the user whose data is being inspected, indicates that the user: (i) submitted an online form by pressing the Enter key on the keyboard, or (ii) clicked or tapped on the on-screen "Submit" button via a mouse or a touch-pad. For example, if statement (i) holds true, then the system adds 4 to the Attack-Relatedness Score of this batch of data.

In some embodiments, the determination may be based at least, or may take into account at least: whether the inspected batch of data of input-unit interactions, of the user whose data is being inspected, indicates that the user: (i) navigates between GUI elements within a single form by using keystrokes (e.g., by pressing the TAB key to move the on-screen pointer to the next field in a form; or by pressing the SHIFT-TAB keyboard shortcut to move the on-screen pointer to the previous button in a set of on-screen buttons), or (ii) the user did not meet this criterion. For example, if statement (i) holds true, then the system adds 6 to the Attack-Relatedness Score of this batch of data.

In some embodiments, the determination may be based at least, or may take into account at least: whether the inspected batch of data of input-unit interactions, of the user whose data is being inspected, indicates that the user: (i) entered at least N percent of the data in a particular form (or web-page), by using manual entry of character-by-character manual typing; or (ii) did not meet this criterion. For example, if statement (i) holds true, then the system deducts 6 from the Attack-Relatedness Score of this batch of data; or, in another implementation, the system adds zero to the Attack-Relatedness Score.

In some embodiments, the determination may be based at least, or may take into account at least: whether the inspected batch of data of input-unit interactions, of the user whose data is being inspected, indicates that the user: (i) entered at least N percent of the characters in a particular form (or web-page), by using Paste operations; or (ii) did not meet this criterion. For example, if statement (i) holds true, then the system adds 8 to the Attack-Relatedness Score of this batch of data.

In some embodiments, the determination may be based at least, or may take into account at least: whether the inspected batch of data of input-unit interactions, of the user whose data is being inspected, indicates that the user: (i) entered data into at least K percent of the Fields in a particular form (or web-page), by using manual entry of character-by-character manual typing; or (ii) did not meet this criterion. For example, if statement (i) holds true, then the system deducts 5 from the Attack-Relatedness Score of this batch of data; or, in another implementation, the system adds zero to the Attack-Relatedness Score.

In some embodiments, the determination may be based at least, or may take into account at least: whether the inspected batch of data of input-unit interactions, of the user whose data is being inspected, indicates that the user: (i) entered data into at least P percent of the Fields in a particular form (or web-page), by using Paste operations; or (ii) did not meet this criterion. For example, if statement (i) holds true, then the system adds 9 to the Attack-Relatedness Score of this batch of data.

In some embodiments, the determination may be based at least, or may take into account at least: whether the inspected batch of data of input-unit interactions, of the user whose data is being inspected, indicates that the user: (i) entered data into an entire particular form, at a data-entry rate (or speed) of at least K characters per second, regardless of which data entry method(s) were used by the user (e.g., manual typing, Paste operations); or (ii) did not meet this criterion. For example, if statement (i) holds true, then the system adds 7 to the Attack-Relatedness Score of this batch of data.

In some embodiments, the determination may be based at least, or may take into account at least: whether the inspected batch of data of input-unit interactions, of the user whose data is being inspected, indicates that the user: (i) entered data into a particular Field in a particular form, at a data-entry rate (or speed) of at least K characters per second, regardless of which data entry method(s) were used by the user (e.g., manual typing, Paste operations); or (ii) did not meet this criterion. For example, if statement (i) holds true, then the system adds 3 to the Attack-Relatedness Score of this batch of data.

In some embodiments, the determination may be based at least, or may take into account at least: whether the inspected batch of data of input-unit interactions, of the user whose data is being inspected, indicates that: (i) in the particular events in which the user has utilized character-by-character Typing as his data-entry method (e.g., and not Paste operations), his average Typing speed across those events was at least M characters per second; or (ii) the user did not meet this criterion. For example, if statement (i) holds true, then the system adds 6 to the Attack-Relatedness Score of this batch of data.

In some embodiments, the determination may be based at least, or may take into account at least: whether the inspected batch of data of input-unit interactions, of the user whose data is being inspected, indicates that: (i) in one particular field in which the user has utilized character-by-character Typing as his data-entry method (e.g., and not Paste operations), his Typing speed across in that particular Field was at least K characters per second; or (ii) the user did not meet this criterion. For example, if statement (i) holds true, then the system adds 4 to the Attack-Relatedness Score of this batch of data.

In some embodiments, the determination may be based at least, or may take into account at least: whether the inspected batch of data of input-unit interactions, of the user whose data is being inspected, indicates that: (i) in a particular pre-defined field (such as, the "Your Last Name" field, in a Billing Address form or web-page), the user performed at least one Delete/Backspace operation; or (II) the user did not meet this condition. For example, if statement (i) holds true, then the system adds 5 to the Attack-Relatedness Score of this batch of data; for example, since a legitimate or genuine user is not expected to make a typographical error when typing his own Last Name, whereas an attacker is more likely to make a typographical error when typing a Last Name of someone else.

In some embodiments, the determination may be based at least, or may take into account at least: whether the inspected batch of data of input-unit interactions, of the user whose data is being inspected, indicates that: (i) in a particular set of fields (such as, the "Your Last Name" field and the "Your First Name" field and the "Your City" address, in a Billing Address form or web-page), the user performed at least one Delete/Backspace operation; or (II) the user did not meet this condition. For example, if statement (i) holds true, then the system adds 4 to the Attack-Relatedness Score of this batch of data; for example, since a legitimate or genuine user is not expected to make a typographical error when typing these data-items, whereas an attacker is more likely to make a typographical error when typing these data-items that are actually someone else's billing data and not his own.

In some embodiments, the determination may be based at least, or may take into account at least: whether the inspected batch of data of input-unit interactions, of the user whose data is being inspected, indicates that: (i) in a particular set of fields (such as, the "Your Last Name" field and the "Your First Name" field and the "Your City" address, in a Billing Address form or web-page), the user did not perform any Delete/Backspace operation, and did not perform any other Corrective operations (e.g., highlighting a character and then typing another character instead of it); or (II) the user did not meet this condition. For example, if statement (i) holds true, then the system adds zero to (or deducts 3 from) the Attack-Relatedness Score of this batch of data; for example, since a legitimate or genuine user is not expected to make a typographical error when typing these data-items, whereas an attacker is more likely to make a typographical error when typing these data-items that are actually someone else's billing data and not his own.

In some embodiments, the determination may be based at least, or may take into account at least: whether the inspected batch of data of input-unit interactions, of the user whose data is being inspected, indicates that: (i) the user exhibited non-segmented (or, generally constant) typing-speed (or generally-constant typing rhythm) in a particular field, or that (ii) the user exhibited segmented (or, generally non-constant) typing-speed (or generally non-constant typing rhythm) in a particular field. For example, if statement (i) holds true, then the system adds 5 to the Attack-Relatedness Score of this batch of data. For example, the Applicants have realized that a genuine user or a legitimate user, who types his own billing address (e.g., "1278 South Washington Boulevard"), is experienced and well-trained in typing his own address; and therefore he types his own address in accordance with a typing rhythm that is non-fixed or non-constant typing speed; for example, he is used to type "12" quickly because those characters are near each other on a QWERTY keyboard, then after a short waiting time-interval is also types quickly "78" because these characters are near each other, then there is a waiting time interval, then he types "South" quickly, then there is a waiting time interval, then he types "Washington" quickly, and so forth. Applicants have further realized that, in contrast, an attacker or a fraudster does not exhibit such non-fixed or non-constant typing rhythm, but rather, the attacker or fraudster is generally agnostic to the content of the data that he is typing (e.g., copied from a list of stolen credentials) and exhibits a fixed typing rhythm with a generally-fixed and non-changing typing speed across the entire field, without exhibiting segmented typing portions in the same field, and without exhibiting field-portions that have fluid typing and other field-portions that have non-fluid typing.

In some embodiments, the determination may be based at least, or may take into account at least: whether the inspected batch of data of input-unit interactions, of the user whose data is being inspected, indicates that: (i) the user exhibited non-segmented (or, generally constant) typing-speed (or, generally constant typing rhythm) across multiple fields of a single fillable form, or that (ii) the user exhibited segmented (or, generally non-constant) typing-speed (or non-constant typing rhythm) across multiple fields of a single fillable form. For example, if statement (i) holds true, then the system adds 6 to the Attack-Relatedness Score of this batch of data.

It is noted that the unique rhythm of typing data into a particular field in a fillable form, such as, the detecting that in a single particular field, a first field-portion is typed quickly (e.g., the word "South" is typed at a speed of 5 characters per second) whereas a second field-portion is typed slowly (e.g., the word "Washington" is typed at a speed of 3 characters per second), is different from some conventional systems that merely track the general, average, typing-speed of a user in order to distinguish among users based on already-known typing speeds of different users, or in order to distinguish between a current user and an imposter based on a historic profile that shows that the "genuine" user types data slowly whereas the current user types data rapidly; such conventional systems do not monitor or identify an internal rhythm in which the typing speed is changed within a single filed (or across multiple fields), and fail to utilize such rhythm in order to detect that the currently-inspected user is a fraudster or an attacker, without the need to compare to a "historical profile" that indicates how the "genuine" user had typed data in the past, or without the need to compare to previous or past typing-speed(s) that were exhibited in the same user-account in previous usage-sessions.

In some embodiments, the system applies a set of such conditions or rules on the batch of data that is being inspected; and updates the Attack-Relatedness Score according to each such condition or rule. Then, the system checks: if the final Attack-Relatedness Score is greater than a pre-defined threshold value, then the system determines that this batch of data is more-likely associated with an Attacker (or a Cyber-Attacker), and generates a cyber-attack notification, and initiates or triggers fraud-mitigation or cyber-attack mitigation processes (e.g., blocking the account; blocking the access; denying a transaction; reversing an already-submitted transaction; canceling a transaction; stopping or cancelling a pending transaction; requiring the user to contact a fraud department by phone or physically at a branch; requiring the user to answer pre-defined security questions; or the like).

In other embodiments, instead of utilizing such Attack-Relatedness Score, or in addition to it, a lookup table may be used in order to reach the Attacker/Non-Attacker determination. For example, the batch of data may be compared to the following demonstrative table:

TABLE 9

| Used CTRL-C ? | Clicked the On-Screen "Submit" Button ? | Corrected Typo in his Last Name ? | Typed at least 3 Characters Per Second ? | Determination: |
|---|---|---|---|---|
| Y | Y | Y | Y | Attacker |
| N | Y | Y | Y | Attacker |
| Y | N | Y | Y | Attacker |
| Y | Y | N | Y | Attacker |
| Y | Y | Y | N | Attacker |
| Y | N | Y | N | Non-Attacker |
| N | Y | N | Y | Non-Attacker |
| N | Y | Y | Y | Non-Attacker |
| Y | N | N | Y | Non-Attacker |
| N | N | N | N | Non-Attacker |
| N | N | N | Y | Non-Attacker |

In some embodiments, instead of utilizing an Attack-Relatedness Score and/or a look-up table, or in addition to such means, the system may utilize a formula or a weighted formula, which is calculated for the inspected batch of data, and is then compared to a pre-defined threshold value or range-of-values. For example, the system may define that B is the number of character-per-second that were typed manually within an entire single form; that U is the number of times that a keyboard shortcut was used within that entire single form; that E is the number of error correction operations (e.g., Delete, Backspace) that were performed within that entire single form; that the parameter L would have a value of "5" if the user submitted the form by pressing Enter on the keyboard, and would have a value of "3" of the user submitted the form by clicking or tapping on the on-screen Submit button. Then, the system may utilize a pre-defined Formula, denoted F, such that, for example: $F=B*U*E/L$, and the system calculates the value of Formula F for the inspected batch of data. Then, the system compares the calculated value of Formula F to a pre-defined threshold value, denoted V; such that, for example, if the calculated value of Formula F is greater than V, then the system makes a Cyber Attack determination; otherwise, the system makes a Non-Attacker determination.

In some embodiments, optionally, one or more of the parameters (e.g., B, U, E, L) may be multiplied by a pre-defined coefficient or a constant or a weighting parameter, based on the Context of the form (or page) from which the data was collected; for example, the system may pre-defined, that for data collected in a "Transfer Money Now" page, the parameter U should be multiplied by a coefficient of "2" (namely, such that 2U will replace U in the Formula F); whereas, in the "Check Account Balance" page, the parameter L should be multiplied by a coefficient of "0.75". In such implementation, the monitoring/tracking/logging unit(s) of the present invention, may further monitor and track and log also the Context in which particular input-unit interactions were performed; such as, that the interaction of "the user moved the on-screen pointer 150 pixels to the left within 0.8 seconds" was performed, contextually, within the "Transfer Money Now" page of the banking website; or even at a more detailed granularity, such as, that said interaction was performed within the "Transfer Money Now" page and more particularly between the "First Name" and "Last Name" fields. The system may take into account such Contextual information when allocating weight to each such interaction.

The multiple conditions or rules or checks or comparisons, that are applied to the batch of data of input-unit interactions, need not necessarily be applied in parallel to each other or in a concurrent manner or simultaneously; but rather, they may be applied serially or sequentially, condition after condition, rule after rule, such that each condition or rule that is applied and is found to hold true—contributes serially (e.g., increases, or decreases, or does not change) to a fraud-relatedness score or to an attack-relatedness score. In some embodiments, once the full set of pre-defined rules or conditions, the final Score is compared to a pre-defined threshold value in order to reach an attacker/non-attacker automatic determination by the system, or in order to reach a fraud/non-fraud automatic determination by the system. In other embodiments, the comparison to the pre-defined threshold value may be performed serially, such as after applying each condition or rule; for example, if already after applying 6 out of the 15 rules, the cumulative Score is already greater than the pre-defined threshold value, then some implementations may proceed to immediately reach the determination of attacker (or fraud) and to trigger mitigation operations.

It is noted that the Score or the Weighted Score that are described above, may be referred to as an Attack-Relatedness Score, or as a Fraud-Relatedness Score; and such Score may be determined by serially applying a set of rules or conditions, to a batch of data reflecting (or indicating, or representing) input-unit(s) interactions of a particular user or of a particular usage-session; for example, using a weighted formula or lookup table or a set of pre-defined score components. For example, each one of the above-mentioned checks or conditions or rules, may be referred to as a "score-component", which may be taken into account when generating the final Score which is then compared to a threshold value in order to determine an attack or a fraud.

Embodiments of the present invention perform monitoring and tracking of the input-unit interactions while the user is actually operating the input units, such as, while the user is typing on a keyboard or moving a mouse or operating a touch-pad. This is in direct contrast, for example, to a conventional CAPTCHA mechanism, which does not monitor the manner in which the CAPTCHA solution is typed, but rather, only compares the already-entered fully-entered solution against a pre-defined correct solution, and only does so in order to distinguish between a human user and a machine (or an automated script).

Embodiments of the present invention may utilize a multiple-prong detection process, such as a dual prong or triple prong detection process, which applies two or three or multiple rules or conditions or checks from those that were described above or are described herein.

In some implementations, for example, a triple detection prong process is utilized. For example, the first detection prong enables the method of the present invention to detect a human attacker because a legitimate user typically types his own username ("JohnSmith") or his password "(Sword-Fish") manually character-by-character; whereas a human attacker often performs a copy-and-paste operation of data-items from a previously-prepared database or list of stolen credentials. The second detection prong enables the method of the present invention to detect a human attacker because a legitimate user typically does not make typographical errors when typing his own name or his own address or his own telephone number; whereas a human attacker who manually copies unfamiliar data from a previously-prepared list is often makes typographical errors and then corrects them while typing. The third detection prong enables the method of the present invention to detect a human attacker because a legitimate user typically types his own name or his own username Faster than usual, or faster than he types other data-items in other fields; and thus a slower typing speed (compared to a pre-defined threshold value) can indicate a human attacker. The present invention may thus detect an attacker or a fraudster or fraudulent activity or cyber-attack activity, by relying on a cumulative analysis that is based on such multiple conditions, that are applied serially to a batch of collected data that reflects the actual input-unit interactions that were performed by the user, within an entire single fillable form, or within an entire single web-page, or within an entire single transaction that spans multiple fillable forms, or within an entire single usage session of that user (e.g., of a logged-in user who logged in and later logged-out and thus defined a usage session), or within an entire usage session that is detected by other means (e.g., a "cookie" file or a "cookie" data-item which tracks once a user is accessing a particular web-site), or the like.

Some embodiments of the present invention may operate to distinguish between (I) an attacker or cyber-attacker or a "fraudster" or an impostor or a non-genuine user or an identity thief, and (II) a legitimate user or a naïve user or a non-attacker or a person who is the true owner of the identity that is being utilized for an online transaction and/or for an online interaction.

In some embodiments, the system distinguishes between a cyber-attacker (e.g., identity thief who utilizes identity data of another person as if he was that other person) and a legitimate user (e.g., who utilizes his own, true, identity data); by utilizing, at least, one or more of the following criteria or conditions or detection rules: (A) detecting whether the analyzed input-unit interactions indicate that the user utilized his Long-Term Memory in order to enter a certain data-item (e.g., indicating a legitimate user), or indicate that the user utilized his Short-Term Memory in order to enter that certain data-item (e.g., indicating an attacker or an identity thief); and/or (B) detecting whether the analyzed input-unit interactions indicate that the user entered data in a Typing-Rhythm that characterizes legitimate users (non-attackers), or indicate that the user entered data in a Typing-Rhythm that characterizes attackers (or identity thieves); and/or (C) detecting whether the analyzed input-unit interactions indicate that the user exhibits Data Familiarity (relative to the data that he is entering) at a level that is equal to or greater than a pre-defined data-familiarity threshold value (indicating a legitimate user), or indicate that the user exhibits Data Familiarity (relative to the data that he is entering) at a level that is smaller than said pre-defined data-familiarity threshold value (indicating an attacker or identity thief); and/or (D) detecting whether the analyzed input-unit interactions indicate that the user exhibits Application Fluency/Intra-Application Fluency at a level that is equal to or greater than a pre-defined application fluency threshold value (e.g., indicating an attacker or an identity thief), or indicate that the user exhibits Application Fluency/Intra-Application Fluency at a level that is smaller than said pre-defined application fluency threshold value (e.g., indicating a legitimate user); and/or (E) detecting whether the analyzed input-unit interactions indicate that the user exhibits Computer Savviness at a level that is equal to or greater than a pre-defined computer savviness threshold value (e.g., indicating an attacker or an identity thief), or indicate that the user exhibits Computer Savviness at a level that is smaller than said pre-defined computer savviness threshold value (e.g., indicating a legitimate user); and/or (F) detecting whether the analyzed input-unit interactions indicate that the user exhibits reaction to Primed (Trained) events or requests in a manner that characterizes attackers (or identity thieves), or indicate that the user exhibits reaction to Primed (Trained) events or requests in a manner that characterizes legitimate users. One, or some, or all of the above-mentioned conditions or rules or criteria, may be used; optionally while combining two or more of them in aggregate; or, optionally, by combining two or more of them in the alternate; and/or in combination with other or additional rules, criteria or conditions.

In accordance with condition (A), the system distinguishes between a cyber-attacker (e.g., identity thief) and a legitimate user (e.g., who utilizes his own, true, identity data), by detecting whether the analyzed input-unit interactions indicate that the user utilized his Long-Term Memory in order to enter a certain data-item (e.g., indicating a legitimate user), or indicate that the user utilized his Short-Term Memory in order to enter that certain data-item (e.g., indicating an attacker or an identity thief). For example, the Applicants have realized that cyber-attackers (or identity thieves) differ from legitimate users in the type of human memory that they utilize in order to restore data and enter it manually. For example, the legitimate user "Christopher Finnegan" fills-up an online application for a credit card, and is requested to enter his first name and his last name; he is 30 years old, and he is very familiar in typing his own name, as he did so hundreds (or thousands) of times in his life; accordingly, when the legitimate user "Christopher Finnegan" manually types his name in the online application form for a credit card, he utilizes his (human) Long-Term Memory for this purpose, which enables him to type it at a particular typing speed (e.g., five characters per second) and which enables him to perform zero pauses or at most one pause while typing his name (e.g., zero pauses, such that he pauses only one time, between typing his first name and typing his last name); and which enables him to easily type at least 6 or 7 characters in a rapid manner without having to pause. In contrast, an identity thief, whose real name is "Bob Smith", and who obtained a list of stolen credentials and copies manually from it the name "Christopher Finnegan", types this data in a different manner from the "real" Christopher Finnegan person; the identity thief does not have the name "Christopher Finnegan" in his (human) long-term memory, since he is not familiar with this name (or with the manner of typing it) for more than a few seconds or minutes; the identity thief looks at his list of stolen credentials, and copies from it, carefully, character by character, the name "Christopher Finnegan"; the identity thief utilizes his (human) Short-Term Memory to perform this task, and he is able to copy 3 or 4 or 5 characters at a time, before pausing slightly and looking again at the source from which he copies, remember again another batch of 3 or 4 or 5 characters, typing them again, and then again referring to the source of the information, remembering again 3 or 4 or 5 characters for typing, and so forth; and thus, the identity thief exhibits utilization of short-term memory for this process, in which he types no more than 5 (or 6) characters at a time before pausing to refer again to his information source, thereby exhibiting a Segmented, Non-Fluent, Non-Fluid pattern or rhythm of typing that relies on short-term memory; whereas the legitimate user (the true, the real "Christopher Finnegan" person) would exhibit fluent, fluid, non-segmented (or: less segmented) typing of his own name. A similar distinction applies with regard to other data-items that are entered by a legitimate user versus an identity thief; such as, a home address of the legitimate user, a telephone number of the legitimate user, a billing address of the legitimate user, or the like.

Accordingly, the system of the present invention may utilize a short-term memory/long-term memory utilization identifier module or unit, able to analyze the input-unit interactions (e.g., the keystrokes that were typed), and able to determine—based on identification of such pauses or segmentation or rhythm—whether or not the keystrokes are sufficiently similar to those that an identity thief would exhibit, or, whether or not the keystrokes are sufficiently similar to those that a legitimate user would exhibit. For example, the system may be configured to define one or more rules or conditions, such as, for demonstrative purposes: (i) that zero or one pauses between sets of characters that are typed in single field, indicate a legitimate owner; and/or (ii) that two or more pauses between sets of characters that are typed in a single field, indicate an attacker or an identity thief; and/or (iii) that typing seven or more characters at a speed that is greater than a pre-defined typing-speed threshold value, indicates a legitimate user, and/or (iv) that never typing seven or more characters at a speed that is greater than said pre-defined typing-speed threshold value, indicates an attacker or an identity thief); and/or (v) that the input-unit interactions indicate that the user typed a data-item in a particular field by relying on his Short-Term Memory, thereby supporting an estimation of an attacker or an identity thief; and/or (vi) that the input-unit interactions indicate that the user typed a data-item in a particular field by relying on his Long-Term Memory, thereby supporting an estimation of a legitimate user.

In some embodiments, optionally, upon detecting that one of said conditions or criterion (which relate to utilization of Long-Term or Short-Term human memory) holds true, an Attack-Relatedness Score or a Fraud-Relatedness Score or an Identity Theft Relatedness Score may be modified, such as, may be increased by a pre-defined number if the condition that holds true indicates an attacker (or identity theft), or may be decreased by a pre-defined number if the condition that holds true indicates a legitimate user.

In accordance with condition (B), the system distinguishes between a cyber-attacker (e.g., identity thief) and a legitimate user (e.g., who utilizes his own, true, identity data), by detecting whether the analyzed input-unit interactions indicate that the user entered data in a Typing-Rhythm that characterizes legitimate users (non-attackers), or indicate that the user entered data in a Typing-Rhythm that characterizes attackers (or identity thieves). For example, the applicants have realized that a legitimate user whose name is, for instance, "Montgomery Remington", is used to typing his name in accordance with a Typing Rhythm that is general non-fixed or non-constant, which he developed by practicing typing his own name for hundreds of times over ten years; whereas, an impostor or attacker or identity thief, who is not familiar with that particular name for more than a few seconds or minutes, types such name in a generally fixed Typing Rhythm in which the user appears to be agnostic to the content that he is typing; such as, the attacker types four characters at a time, then pauses a little to copy another batch of four characters, and so forth; being agnostic to the data being typed; whereas the legitimate user "Montgomery Remington" enters the data in a non-agnostic manner, in which certain consecutive characters in his name are typed faster, and certain other consecutive characters in his name are typed slower. It is noted that this condition does Not focus on the average (or maximum, or minimum) "typing speed" (or "typing rate") that was exhibited in a certain field, or in multiple fields of a form; but rather, it focuses on the Typing Rhythm or the Typing Pattern or the Typing Tempo that is identified from the input-unit interactions, which takes into account segmentation (or non-segmentation) or pausing (or non-pausing) of the entered (typed) data, the particular timing in which each character or string-portion was typed, the time-length that it took the user to enter a particular sub-string of the entire string of characters, the number and/or timing of pauses between typing-segments, and/or other characteristics of the rhythm or the pattern that characterizes the entered keystrokes.

Accordingly, the system of the present invention may utilize a Typing Rhythm identifier module or unit, able to analyze the input-unit interactions (e.g., the keystrokes that were typed), and able to determine—based on identification of such pauses or segmentation or rhythm—whether or not the Rhythm of the keystrokes is sufficiently similar to those that an identity thief would exhibit, or, whether or not the Rhythm of the keystrokes is sufficiently similar to those that a legitimate user would exhibit. For example, the system may be configured to define one or more rules or conditions, such as, for demonstrative purposes: (i) that a generally monotonic or content-agnostic typing rhythm indicates an attacker; and/or (ii) that a typing rhythm that includes more than K pauses per N typed characters (wherein each pause is defined as at least T milliseconds without keystrokes) indicates an attacker; and/or other suitable conditions or criteria.

In some embodiments, optionally, upon detecting that one of said conditions or criterion (which relate to Typing Rhythm or Typing Pattern or Typing Tempo) holds true, an Attack-Relatedness Score or a Fraud-Relatedness Score or an Identity Theft Relatedness Score may be modified, such as, may be increased by a pre-defined number if the condition that holds true indicates an attacker (or identity theft), or may be decreased by a pre-defined number if the condition that holds true indicates a legitimate user.

In accordance with condition (C), the system distinguishes between a cyber-attacker (e.g., identity thief) and a legitimate user (e.g., who utilizes his own, true, identity data), by detecting whether the analyzed input-unit interactions indicate that the user exhibits Data Familiarity (relative to the data that he is entering) at a level that is equal to or greater than a pre-defined data-familiarity threshold value (indicating a legitimate user), or indicate that the user exhibits Data Familiarity (relative to the data that he is entering) at a level that is smaller than said pre-defined data-familiarity threshold value (indicating an attacker or identity thief. For example, the system of the present invention utilizes a set of conditions or criteria, to analyze the input-unit interactions of the user (keystrokes, mouse gestures, touch-pad gestures, or the like) in order to determine a Data Familiarity score that indicates how familiar the user (who entered the data) is with the data that he entered. To establish the Data Familiarity score, the system may utilize one or more conditions or criterions, for example: (i) the average data-entry speed that was exhibited through the input-unit interactions; (ii) the maximum data-entry speed that was exhibited in a "burst" or a segment of interactions (e.g., even though the Average data-entry speed at the entire fillable form was 3 characters per second, there was identified a Maximum data-entry speed of 7 characters per second when typing data into the field of "billing address"); (iii) the minimum data-entry speed that was exhibited in a "burst" or a segment of interactions (e.g., even though the Average data-entry speed at the entire fillable form was 5 characters per second, there was identified a Maximum data-entry speed of 1.25 characters per second when typing data into the field of "your phone number"); (iv) identification of long pauses (e.g., defined as a pause having no data-entry or no typing activity for at least T milliseconds), within the data entry into a single particular field; (v) identification of long pauses (e.g., defined as a pause having no data-entry or no typing activity for at least T milliseconds), within the data entry into two particular fields (e.g., a pause of 8 seconds between finishing to type the First Name in its field, and starting to type the Last Name in its field, indicating an attacker or identity thief rather than a legitimate user); (vi) detecting a long pause (e.g., more than K seconds) before the user types data into a particular type of field, for example, a bank routing number, since a legitimate user typically does Not remember by heart his bank's routing number and has to look it up before typing, therefore such long pause supports a determination of a legitimate user; and/or (vii), conversely, detecting a short pause (e.g., less than K seconds) before the user types data into a particular type of field, for example, a bank routing number, since an attacker or an identity thief often has this data-item ready and handy (e.g., a printed page of stolen credentials and banking data that the attacker prepares in advance in order to shorten as much as possible the fraudulent operation), therefore such short pause (and not a long pause) supports a determination of an attacker or identity thief; and/or other suitable conditions or criteria to establish Data Familiarity.

In some embodiments, optionally, upon detecting that one of said conditions or criterion (which relate to Data Familiarity) holds true, an Attack-Relatedness Score or a Fraud-Relatedness Score or an Identity Theft Relatedness Score may be modified, such as, may be increased by a pre-defined number if the condition that holds true indicates an attacker (or identity theft), or may be decreased by a pre-defined number if the condition that holds true indicates a legitimate user.

In accordance with condition (D), the system distinguishes between a cyber-attacker (e.g., identity thief) and a legitimate user (e.g., who utilizes his own, true, identity data), by detecting whether the analyzed input-unit interactions indicate that the user exhibits Application Fluency/Intra-Application Fluency at a level that is equal to or greater than a pre-defined application fluency threshold value (e.g., indicating an attacker or an identity thief), or indicate that the user exhibits Application Fluency/Intra-Application Fluency at a level that is smaller than said pre-defined application fluency threshold value (e.g., indicating a legitimate user). For example, a legitimate user that fills-out an online form of an application for a credit card, is typically non-familiar with the particular form presented to her (e.g., since it is, typically, the first time that she encounters this particular application form), and/or she exhibits pauses and time-gaps which lack data-entry, during such pauses and time-gaps she actually reads the on-screen instructions or questions; and she thus exhibits non-fluent or non-fluid or segmented data entry. In contrast, an attacker or identity thief, is often very familiar with the particular form that he fills and submits, for example, as he is often submitting numerous such forms in order to have at least one of them approved, based on numerous sets of stolen credentials; or because he wishes to make the attack session as short as possible (time-wise) in order to reduce the possibility of being detected; and therefore, the cyber-attacker or the identity thief exhibits less (or shorter) or no such time-gaps or pauses or delays within data-entry, and exhibits less (or shorter) or no time-intervals that are utilized for reading lengthy instructions on the screen (since he is familiar with the application form from previous attempts). For example, a website in which a user fills-out a form to request a new credit card, is divided into two consecutive screens or pages or web-pages or forms; in the first screen, the user fills out her name and address; in the second screen, the user is firstly presented with four lines of text describing the decision-making process of the bank, and only after those four lines of text, appear additional fields for filling out by the user (e.g., your annual income, your gender, your occupation); in such scenario, a legitimate user would typically exhibit a time-slot or a delay or a time-gap, of at least T seconds (e.g., at least 3 seconds, or at least 4 seconds), between the moment in which the second page is displayed to her, until she begins to enter data into the first field of that second form, since she needs those T seconds in order to read the four lines of text at the top of the second page. In contrast, an attacker or an identity thief, who is prepared for the attack or who is experienced and familiar with this particular interface and its content, would not exhibit the delay or time-slot or time-gap for reading the text (that he is already familiar with), and will proceed to immediately start to fill-out the data in the first field of the second page (e.g., after a time period that is smaller than T seconds, from the display of the second page to him). Similar time-gaps or delays may be detected, for example, with regard to the interaction of the user with particular GUI elements; such as, a user that rapidly selects an option from a Nested on-screen menu (e.g., selects an option from Menu 1 which has 5 options; the selection causes Menu 2 to appear, and the user rapidly selects an option from it), within a pre-defined time period (e.g., performing a nested menu selection within K milliseconds from the first display of the top menu), thereby indicating that the user is an attacker who is familiar with the GUI elements of the particular application being attacked, rather than being a legitimate user who is not yet familiar with the GUI elements of that web-page or form or page or application.

Accordingly, the system may utilize an Application Fluency/Intra-Application Fluency detector module or unit, which may apply one or more conditions, criteria or rules to determine whether the input-unit interactions support a determination of an attacker (or identity thief) or a legitimate user; for example, for demonstrative purposes: (i) if the interactions exhibit a time-slot of at least T seconds of no data-entry, from the display of a new fillable form until the first data-entry operation (e.g., the first keystroke, or the first mouse-click), then this supports a determination of a legitimate user who spends T or more seconds to read a preceding text in the form; and/or (ii) conversely, if the interactions do not exhibit a time-slot of at least T seconds of no data-entry, from the display of a new fillable form until the first data-entry operation (e.g., the first keystroke, or the first mouse-click), then this supports a determination of an attacker (or identity thief) who does not need to spend time to read a preceding text in the form; and/or (iii) if the selection from a menu, or from a nested menu or from a cascading set of menus, or the interaction with a particular GUI element (e.g., a drop-down menu), takes at least K milliseconds (e.g., from the commencement of the interaction with that GUI element, until the end of the interaction with that GUI element), then this supports a determination of a legitimate user who needs more time (than an attacker) to interact with a GUI element that is unfamiliar to him; and/or (iv) conversely, if the selection from a menu, or from a nested menu or from a cascading set of menus, or the interaction with a particular GUI element (e.g., a drop-down menu), takes K or less milliseconds (e.g., from the commencement of the interaction with that GUI element, until the end of the interaction with that GUI element), then this supports a determination of an attacker or an identity thief, who needs a shorter time to interact with a GUI element that is already familiar to him; and/or other suitable conditions or criteria or rules.

In some embodiments, optionally, upon detecting that one of said conditions or criterion (which relate to Application Fluency or to Intra-Application Fluency) holds true, an Attack-Relatedness Score or a Fraud-Relatedness Score or an Identity Theft Relatedness Score may be modified, such as, may be increased by a pre-defined number if the condition that holds true indicates an attacker (or identity theft), or may be decreased by a pre-defined number if the condition that holds true indicates a legitimate user.

In accordance with condition (E), the system distinguishes between a cyber-attacker (e.g., identity thief) and a legitimate user (e.g., who utilizes his own, true, identity data), by detecting whether the analyzed input-unit interactions indicate that the user exhibits Computer Savviness at a level that is equal to or greater than a pre-defined computer savviness threshold value (e.g., indicating an attacker or an identity thief), or indicate that the user exhibits Computer Savviness at a level that is smaller than said pre-defined computer savviness threshold value (e.g., indicating a legitimate user). The Applicants have realized that a cyber-attacker or an identity-thief typically exhibits Computer Savviness at a level that is higher, or significantly higher, than a non-attacker user or a naïve user or a legitimate user. For example, a cyber-attacker, unlike a legitimate user, is more likely to utilize, or utilizes more often or more times, keyboard shortcuts, copy and paste operations, navigation shortcuts (e.g., TAB to move the on-screen-pointer to the next field, or SHIFT+TAB to move the on-screen-pointer to the previous field), mouse-wheel scrolling, rapid mouse-wheel scrolling (e.g., at a wheel-scrolling speed that is faster than a pre-defined threshold value), utilization (or rapid utilization, faster than a pre-defined threshold speed) of nested menus or cascading menus, utilization of keyboard shortcuts or GUI-element maneuvers that are considered to be (or are pre-defined in the system as) obscure or rare or less-known (for example, the less-known keyboard shortcut of ALT+ESC for rapid and direct switching between open windows without previewing them; in contrast with the well-known keyboard shortcut of ALT+TAB); fast typing speed (e.g., relative to a threshold value of typing speed); short or shorter time-gaps between data-entry in multiple fields (e.g., relative to a threshold value of time-length); and/or other indications that the input-unit interactions indicate that the user has Computer Savviness that is estimated to be greater than a pre-defined threshold value, thereby supporting a determination of an attacker and not a legitimate user.

In some embodiments, a Computer Savviness score may be maintained and updated (e.g., increased) upon each observation of an input-unit interaction that is pre-defined as "advanced". For example, upon commencing to analyze a batch of input-unit interactions (e.g., associated with filling-out an online credit card application form), the Computer Savviness score may be reset to zero. Upon each observation of utilization of CTRL+V, the Computer Savviness score is increased by 3. Upon each observation of utilization of ALT+TAB, the Computer Savviness score is further increased by 4. Upon each observation of utilization of ALT+ESC, the Computer Savviness score is further increased by 6. Upon observing that the user typed data at an average speed of more than 6 characters per second, the Computer Savviness score is further increased by 5. The system may thus update the Computer Savviness score by applying, serially, one after the other, such conditions or rules. If the Computer Savviness score is greater than a pre-defined threshold value (e.g., 35), then this supports a determination that the input-unit interactions were performed by an attacker (or identity thief), and not by a legitimate user or non-attacker.

In some embodiments, optionally, upon detecting that one of said conditions or criterion (which relate to Computer Savviness) holds true, an Attack-Relatedness Score or a Fraud-Relatedness Score or an Identity Theft Relatedness Score may be modified, such as, may be increased by a pre-defined number if the condition that holds true indicates an attacker (or identity theft), or may be decreased by a pre-defined number if the condition that holds true indicates a legitimate user.

In accordance with condition (F), the system distinguishes between a cyber-attacker (e.g., identity thief) and a legitimate user (e.g., who utilizes his own, true, identity data), by detecting whether the analyzed input-unit interactions indicate that the user exhibits reaction to Primed (Trained) events or requests in a manner that characterizes attackers (or identity thieves), or indicate that the user exhibits reaction to Primed (Trained) events or requests in a manner that characterizes legitimate users. The Applicants have realized that "priming" information can be used in order to support the detection of attackers (or identity thieves), or conversely in order to support the detection of legitimate users. Accordingly, the present invention may utilize Priming, which is a non-conscious form of human memory concerned with perceptual identification of objects or events, or particularly, the activation of particular representations or associations in memory (or in behavior) immediately before performing a particular task or action. For example, a legitimate user who is a 40 year old citizen and resident of the United States, is well-trained in entering his social security number (SSN) in a format of 3-2-4 digits, since he had utilizes this segmentation of digits for hundreds of times across various forms and applications in his past 20 years. Therefore, when the legitimate user enters his SSN into a fillable form, which Primes him (requests from him) to enter it as nine digits, the legitimate user would exhibit rapid data-entry with short time-gaps between the three segments (e.g., two time gaps that are shorter than T milliseconds), namely, he would exhibit segmented typing of 3-2-4 digits. In contrast, an attacker or an identity thief, who is a resident and citizen of China, is often less-trained (and is not "primed") with regard to entry of SSN in the segments of 3-2-4 digits; and therefore his data-entry manner of a stolen SSN would be different from that of the legitimate user, for example, as the foreign attacker (who is not "primed" or trained over 20 years of entering SSN data-items) may enter the nine digits as 3-3-3 digit segments, or as 4-4-1 digit segments, or as 2-3-4 digit segments; and, additionally or alternatively, such attacker may exhibit longer pauses between his digit-segments, relative to a pre-defined threshold value.

It is noted that the identification of "priming" reactions is not limited to data-entry of SSN items; but rather, may be utilized with other types of data-items in which a legitimated user is "primed" or trained to enter the data in a particular manner or rhythm or pattern (e.g., his phone number; his billing address) whereas an attacker is not "primed". It is further noted that the "priming" may be utilized in a reverse manner; for example, by identifying input-unit interactions that indicate that a particular behavior is "primed" as it is typically known to attackers, whereas it is not well-known to legitimate users.

In some embodiments, optionally, upon detecting that one of said conditions or criterion (which relate to Priming of users) holds true, an Attack-Relatedness Score or a Fraud-Relatedness Score or an Identity Theft Relatedness Score may be modified, such as, may be increased by a pre-defined number if the condition that holds true indicates an attacker (or identity theft), or may be decreased by a pre-defined number if the condition that holds true indicates a legitimate user.

In some embodiments, the system may utilize a Model Constructor unit or module to perform the following: (a) to construct an Attacker Model that characterizes the input-unit interactions of a population of users that are known to be attackers or identity thieves or "fraudster"; and/or, (b) to construct a Legitimate User Model that characterizes the input-unit interactions of a population of users that are known to be non-attackers.

For example, Model Constructor unit or module analyze the input-unit interactions in 300 usage-sessions that are known to be associated with fraud; and detects that in 290 of these 300 usage sessions, the user performed at least one "CTRL+V" operation, and performed at least one manual correction of a typed home address, and waited less than 0.8 seconds from the moment that Page-2 of the fillable form was presented to him until he started to perform data-entry. The Model Constructor unit or module may thus determine that these characteristics, that were exhibited in 290 out of 300 usage sessions of attackers, and that were exhibited in only 7 out of 400 other usage sessions that are known to be of legitimate users, are suitable for inclusion in an Attacker Model. Subsequently, if a newly inspected usage session exhibits these three characteristics, then, based on the comparison to the Attacker Model, the system determines that the newly-inspected usage session is associated with an attacker, and not with a legitimate user.

Similarly, for example, Model Constructor unit or module analyze the input-unit interactions in 400 usage-sessions that are known to be associated with legitimate user and are known to be genuine and not-associated with fraud; and detects that in 394 of these 400 usage sessions, the user performed zero "CTRL+V" operations, and performed zero corrections of a typed home address, and waited more than 3 seconds from the moment that Page-2 of the fillable form was presented to him until he started to perform data-entry. The Model Constructor unit or module may thus determine that these characteristics, that were exhibited in 394 out of 400 usage sessions of legitimate users, and that were exhibited in only 6 out of 300 other usage sessions that are known to be of attackers, are suitable for inclusion in a Legitimate User Model. Subsequently, if a newly inspected usage session exhibits these three characteristics, then, based on the comparison to the Legitimate User Model, the system determines that the newly-inspected usage session is associated with a legitimate user or with a non-attacker.

It is noted that the Model(s) that are generated, and which are later utilized for comparing a batch of data to such Model(s), are Not a "user specific profile" of a particular user, and are Not a "historic" profile of a particular user, and are Not a "user-specific signature" of a particular user. Rather, such Attacker Model is a model of characteristics that generally characterize the input-unit interactions of a population or group of users that are known to be attackers (or identity thieves); and similarly, such Legitimate User Model is a model of characteristics that generally characterize the input-unit interactions of a population or group of users that are known to be non-attackers. Accordingly, the analyzed batch of user interactions is Not compared to a "historic" profile, of that same user or of any other particular user; but rather, the analyzed batch of user interactions is compared to the Attacker Model in order to support a determination of attacker, and/or is compared to the Legitimate User Model in order to support a determination of legitimate user.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

The present invention may be implemented by using hardware units, software units, processors, CPUs, DSPs, integrated circuits, memory units, storage units, wireless communication modems or transmitters or receivers or transceivers, cellular transceivers, a power source, input units, output units, Operating System (OS), drivers, applications, and/or other suitable components.

The present invention may be implemented by using a special-purpose machine or a specific-purpose that is not a generic computer, or by using a non-generic computer or a non-general computer or machine. Such system or device may utilize or may comprise one or more units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

The present invention may be implemented by using code or program code or machine-readable instructions or machine-readable code, which is stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such device to perform a method in accordance with the present invention.

The present invention may enable machines and/or computerized systems to have new capabilities and/or new functions that were not available to such machines or systems so far; including, for example: a new capability to correctly differentiate among multiple human users; a new capability for machines or computerized systems to differentiate between (I) a legitimate or "naïve" user, and (II) a fraudster or a human user having criminal intent or an illegitimate user; a new capability for machines or computerized systems allowing the machine or the computerized system to defend itself or to protect itself against cyber-attacks and/or illegitimate operations, and/or against impostors or identity-thieves or dishonest users; a new capability for machines or computerized systems to correctly identify and/or detect that a current user of an online resource or an online destination, is not the same human user that had accessed the same resource previously, even if the two access sessions were performed via the same device and/or via the same browser or application and/or from the same IP address and/or when the user/s are already logged-in and/or are already authenticated; a new capability for machines or computerized systems to defend or protect themselves against fraudulent transactions or criminal behavior or against hackers, crackers, human hackers, automated hacking tools, "bot" or other automated scripts; a new capability for machines or computerized systems to initiate and to perform fraud-mitigation operations based on analysis of user interactions; improved security and/or integrity and/or reliability of machines and computerized systems; and/or other new capabilities that conventional machines and conventional computerized systems do not have and that the present invention provides.

Embodiments of the present invention may be utilized with a variety of devices or systems having a touch-screen or a touch-sensitive surface; for example, a smartphone, a cellular phone, a mobile phone, a smart-watch, a tablet, a handheld device, a portable electronic device, a portable gaming device, a portable audio/video player, an Augmented Reality (AR) device or headset or gear, a Virtual Reality (VR) device or headset or gear, a "kiosk" type device, a vending machine, an Automatic Teller Machine (ATM), a laptop computer, a desktop computer, a vehicular computer, a vehicular dashboard, a vehicular touch-screen, or the like.

The system(s) and/or device(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules.

The system(s) and/or devices of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process (es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments of the present invention may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a list of reference value(s) or a database of reference values or ranges; a comparison or matching or searching process which searches for matches and/or identical results and/or similar results and/or sufficiently-close results, among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Repeated use of the phrase "in one embodiment" does not necessarily refer to the same embodiment, although it may. Repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may comprise, or may be implemented by using, an "app" or application which may be downloaded or obtained from an "app store" or "applications store", for free or for a fee, or which may be pre-installed on a computing device or electronic device, or which may be transported to and/or installed on such computing device or electronic device.

In some embodiments, a method comprises: (a) monitoring input-unit interactions of a user, who utilizes one or more input units of an electronic device to fill-out data in a fillable form of a computerized service; (b) for a batch of input-unit interactions of said user, determining a first score-component which reflects whether said user performed manual character-by-character typing or copy-and-paste operations; (c) for said batch of input-unit interactions of said user, determining a second score-component which reflects whether said user performed manual correction operations of typed characters; (d) for said batch of input-unit interactions of said user, determining a third score-component which reflects whether said user entered data at a data-entry speed that is greater than a first threshold value; (e) determining an attack-relatedness score, based on a weighted formula that takes into account at least said first score-component, said second score-component, and said third score-component; (f) if said attack-relatedness score is greater than a second threshold value, then: determining that said input-unit interactions are part of a attack, and initiating one or more mitigation operations.

In some embodiments, steps (b) and (c) and (d) comprise analyzing said batch of user-input interactions which includes interactions within a single fillable form.

In some embodiments, steps (b) and (c) and (d) comprise analyzing said batch of user-input interactions which includes interactions across multiple fillable forms that are filled by said user.

In some embodiments, steps (b) and (c) and (d) comprise analyzing said batch of user-input interactions which includes interactions across multiple web-pages that belong to a single usage session of said user.

In some embodiments, steps (b) and (c) and (d) comprise: analyzing a rate of manual data entry by said user into said fillable form of said computerized service; if said rate of manual data entry is generally constant for all fields in said fillable form, then determining that said user is an attacker.

In some embodiments, steps (b) and (c) and (d) comprise: analyzing a rate of manual data entry by said user into said fillable form of said computerized service; if (a) the rate of manual data entry by said user is constant for a first group of fields in said fillable form, and (b) the rate of manual data entry by said user is varying for a second group of fields in said fillable form, then: determining that said user is a non-attacker.

In some embodiments, the method comprises: (A) defining a particular field in said fillable form of said computerized service, as a field that human users are unfamiliar with and type data therein at a typing speed that is smaller than a pre-defined typing-speed threshold value; (B) detecting that said user typed data into said particular field at an actual typing speed that is equal to or greater than said pre-defined typing-speed threshold value; and based on said detecting, determining that said user is an attacker.

In some embodiments, steps (b) and (c) and (d) comprise analyzing said batch of user-input interactions which are interactions of a new user (I) that is not logged in to said computerized service and (II) that is accessing said computerized service for the first time and (III) that is not associated with any pre-defined user profile derived from prior visits.

In some embodiments, steps (b) and (c) and (d) comprise analyzing said batch of user-input interactions which are interactions of a user that already passed a CAPTCHA challenge and already proved that he is a human and not a machine.

In some embodiments, steps (b) and (c) and (d) comprise analyzing said batch of user-input interactions which are interactions of an already logged-in user that had successfully authenticated himself to the computerized service; wherein the method comprises determining that said user is an attacker even though he had successfully authenticated himself to the computerized service.

In some embodiments, a process comprises: (a) monitoring keyboard interactions of a user, who utilizes a keyboard of an electronic device to fill-out data in a fillable form of a computerized service; (b) for a batch of keyboard interactions of said user, determining a first score-component which reflects whether said user performed via said keyboard manual character-by-character typing or copy-and-paste operations; (c) for said batch of keyboard interactions of said user, determining a second score-component which reflects whether said user performed via said keyboard manual correction operations of typed characters; (d) for said batch of keyboard interactions of said user, determining a third score-component which reflects whether said user entered data via said keyboard at a speed greater than a first threshold value; (e) determining an attack-relatedness score, based on a weighted formula that takes into account at least said first score-component, said second score-component, and said third score-component; (f) if said attack-relatedness score is greater than a second threshold value, then: determining that said input-unit interactions are part of an attack, and initiating one or more mitigation operations.

In some embodiments, a method comprises: (a) monitoring input-unit interactions of a user, who utilizes one or more input units of an electronic device to fill-out data in a fillable form of a computerized service; (b) analyzing a batch of input-unit interactions of said user, relative to a pre-generated attacker interactions model that indicates characteristics of input-unit interactions of a plurality of users that are known to be attackers; (c) if said batch of input-unit interactions of said user, is sufficiently similar beyond a threshold-level of similarity to said attackers interactions model, then: determining that said input-unit interactions are part of an attack, and initiating one or more mitigation operations.

In some embodiments, the analyzing of step (b) comprises: based on analysis of said batch of input-unit interactions of said user, determining an estimated level of data familiarity of said user with data that was entered via said input-unit interactions; if the estimated level of familiarity of said user with the data that was entered, is smaller than a pre-defined threshold level of data familiarity, then: determining that said input-unit interactions are part of an attack, and initiating one or more mitigation operations.

In some embodiments, the analyzing of step (b) further comprises: based on analysis of said batch of input-unit interactions of said user, determining an estimated level of application fluency of said user with regard to utilization of the computerized service that was accessed via said input-unit interactions; if the estimated level of application fluency of said user with regard to utilization of the computerized service, is greater than a pre-defined threshold level of application fluency, then: determining that said input-unit interactions are part of an attack, and initiating one or more mitigation operations.

In some embodiments, the analyzing of step (b) further comprises: based on analysis of said batch of input-unit interactions of said user, detecting a data-entry sequence of input-unit interactions that indicates prior priming of said user with regard to data-entry into a particular field that is pre-defined as a field that attackers are primed for and that legitimate users are not primed for; based on detection of said prior priming of said user with regard to data-entry into said particular field, determining that said input-unit interactions are part of an attack, and initiating one or more mitigation operations.

In some embodiments, the analyzing of step (b) further comprises: based on analysis of said batch of input-unit interactions of said user, detecting a data-entry sequence of input-unit interactions that indicates lack of prior priming of said user with regard to data-entry into a particular field that is pre-defined as a field that legitimate users are primed for and that attackers are not primed for; based on detection of lack of prior priming of said user with regard to data-entry into said particular field, determining that said input-unit interactions are part of an attack, and initiating one or more mitigation operations.

In some embodiments, the analyzing of step (b) further comprises: defining a string-length, wherein users that type a set of characters having at least said string-length in a non-segmented typing pattern are classified as legitimate users, wherein users that type a set of characters having at least said string-length in a segmented typing pattern are classified as attackers; analyzing said batch of input-unit interactions of said user, and detecting that said input-unit interactions comprise typing of a set of characters having at least said string-length in a segmented typing pattern; and based on said detecting, determining that said input-unit interactions are part of an attack, and initiating one or more mitigation operations.

In some embodiments, the analyzing of step (b) further comprises: defining a first typing rhythm as a typing rhythm that characterizes attackers; defining a second typing rhythm as a typing rhythm that characterizes non-attackers; analyzing said batch of input-unit interactions of said user, and detecting that said input-unit interactions of said user exhibit a particular typing rhythm that is similar to said first typing rhythm which characterizes attackers; and based on said detecting, determining that said input-unit interactions are part of an attack, and initiating one or more mitigation operations.

In some embodiments, the analyzing of step (b) further comprises: defining a first typing segmentation pattern as a typing segmentation pattern that characterizes attackers; defining a second typing segmentation pattern as a typing segmentation pattern that characterizes non-attackers; analyzing said batch of input-unit interactions of said user, and detecting that said input-unit interactions of said user exhibit a particular typing segmentation pattern that is similar to said first typing segmentation pattern which characterizes attackers; and based on said detecting, determining that said input-unit interactions are part of an attack, and initiating one or more mitigation operations.

In some embodiments, the analyzing of step (b) further comprises: defining a computer savviness score-component; increasing said computer savviness score-component upon detection of utilization of a data-entry keyboard shortcut within said batch of input-unit interactions of said user; increasing said computer savviness score-component upon detection of utilization of a field-navigation keyboard shortcut within said batch of input-unit interactions of said user; increasing said computer savviness score-component upon detection of utilization of an input-unit operation that is pre-defined as an operation that is performed only by expert users; if said computer savviness score-component for said batch of input-unit interactions of said user, is greater than a pre-defined computer savviness threshold value, then: determining that said input-unit interactions are part of an attack, and initiating one or more mitigation operations.

It is noted that a level of Familiarity of a user with a GUI or a GUI-element or a content or a page or a form or an application, is different from the level of Expertise (or computer savviness) of the user. For example, user Adam may be a 38 year old person who works as a computer programmer for 15 years, and is an expert in programming in JavaScript and C++, and is very proficient with utilizing the computer-mouse and the keyboard; and may be very experienced in utilizing various websites such as Amazon or eBay; however, user Adam may still be entirely non-familiar, and may have a very low level of familiarity, with the content and/or GUI of a particular website such as MyBank.com, which may have a relatively confusing user interface with cascaded menus and with many options to choose from; and thus, user Adam, even though he is very proficient in utilizing computers in general, and even in developing websites, may spend 24 seconds in his first visit to MyBank.com until he finds out the nested link to request a credit card application. As demonstrated, high level of expertise or high level of computer savviness, does not necessarily derive or equate to a high level of familiarity with a website or a form or a user interface of a particular online destination. Similarly, user Barbara may be a 76 year old female who utilizes her laptop computer for two, and only two, specific purposes on a daily basis: for performing a video conference with her grandson every afternoon, and for checking her bank account balance every morning at MyBank.com through the same web browser. Accordingly, even though user Barbara does not have expertise in utilizing computers, and is not a computer-savvy user, user Barbara is—due to her regular and repeated daily visit to MyBank.com every morning in the past three years—extremely familiar with the user interface of that particular website, and is able to access the "show my account balance" link or button rapidly, such as within 3 seconds of the web-page loading and being displayed to her.

Some embodiments of the present invention may utilize pre-defined lists or tables or rules, which define: (i) which fields are generally associated with high level of Data Familiarity for a legitimate user (e.g., First Name; Last Name); (ii) which fields are generally associated with low level of Data Familiarity for a legitimate user (e.g., bank routing number, which many or most legitimate users do not memorize and they need to look it up when requested to enter it). Accordingly, detecting that the input-unit interactions indicate that the user has a low level of Data Familiarity in relation to the "last name" field (e.g., due to lags, delay, segmented typing, and/or corrections of typographical errors), may lead to a determination that the user is actually an attacker or an identity thief. Additionally or alternatively, detecting that the input-unit interactions indicate that the user has a high level of Data Familiarity in relation to the "bank routing number" field (e.g., due to rapid and/or non-segmented typing in that field, and/or due to no delay between the filling out of a previous field and the filling out of this field), may lead to a determination that the user is actually an attacker or an identity thief who has the bank routing number handy and ready (e.g., from a list of stolen credentials).

In some embodiments, a process comprises: (a) monitoring input-unit interactions of a user, who utilizes one or more input units of an electronic device to fill-out data in a fillable form of a computerized service; (b1) for a batch of input-unit interactions of said user, determining a first score-component which reflects whether said user utilized keyboard shortcuts for data entry and for in-page navigation; (b2) for said batch of input-unit interactions of said user, determining a second score-component which reflects an estimated level of computer-savviness of said user; (b3) for said batch of input-unit interactions of said user, determining a third score-component which reflects an estimated level of familiarity of said user with data that was entered via said input-unit interactions; (b4) for said batch of input-unit interactions of said user, determining a fourth score-component which reflects an estimated level of familiarity of said user with a Graphical User Interface (GUI) of said computerized service; (b5) for said batch of input-unit interactions of said user, determining a fifth score-component which indicates whether said user exhibits primed behavior with regard to data entry via a particular GUI element; (b6) for said batch of input-unit interactions of said user, detecting a particular typing rhythm of said user, and determining a sixth score-component which indicates whether said particular typing rhythm is sufficiently similar to one or more typing rhythms that are pre-defined as typing rhythms of attackers; (c) determining an attack-relatedness score, based on a weighted formula that takes into account at least said first score-component, said second score-component, said third score-component, said fourth score-component, said fifth score-component, and said sixth score-component; (d) if said attack-relatedness score is greater than a particular threshold value, then: determining that said input-unit interactions are part of an attack, and initiating one or more mitigation operations.

In some embodiments, a method comprises: (a) monitoring input-unit interactions of a user, who utilizes one or more input units of an electronic device to fill-out data in a fillable form of a computerized service; (b) analyzing a batch of input-unit interactions of said user, relative to a pre-generated attacker interactions model that indicates characteristics of input-unit interactions derived from analysis of interactions performed by a plurality of users that are known to be attackers; (c) if said batch of input-unit interactions of said user, is sufficiently similar beyond a threshold-level of similarity to said attackers interactions model, then: determining that said input-unit interactions are part of an attack, and initiating one or more mitigation operations.

Figure 5:
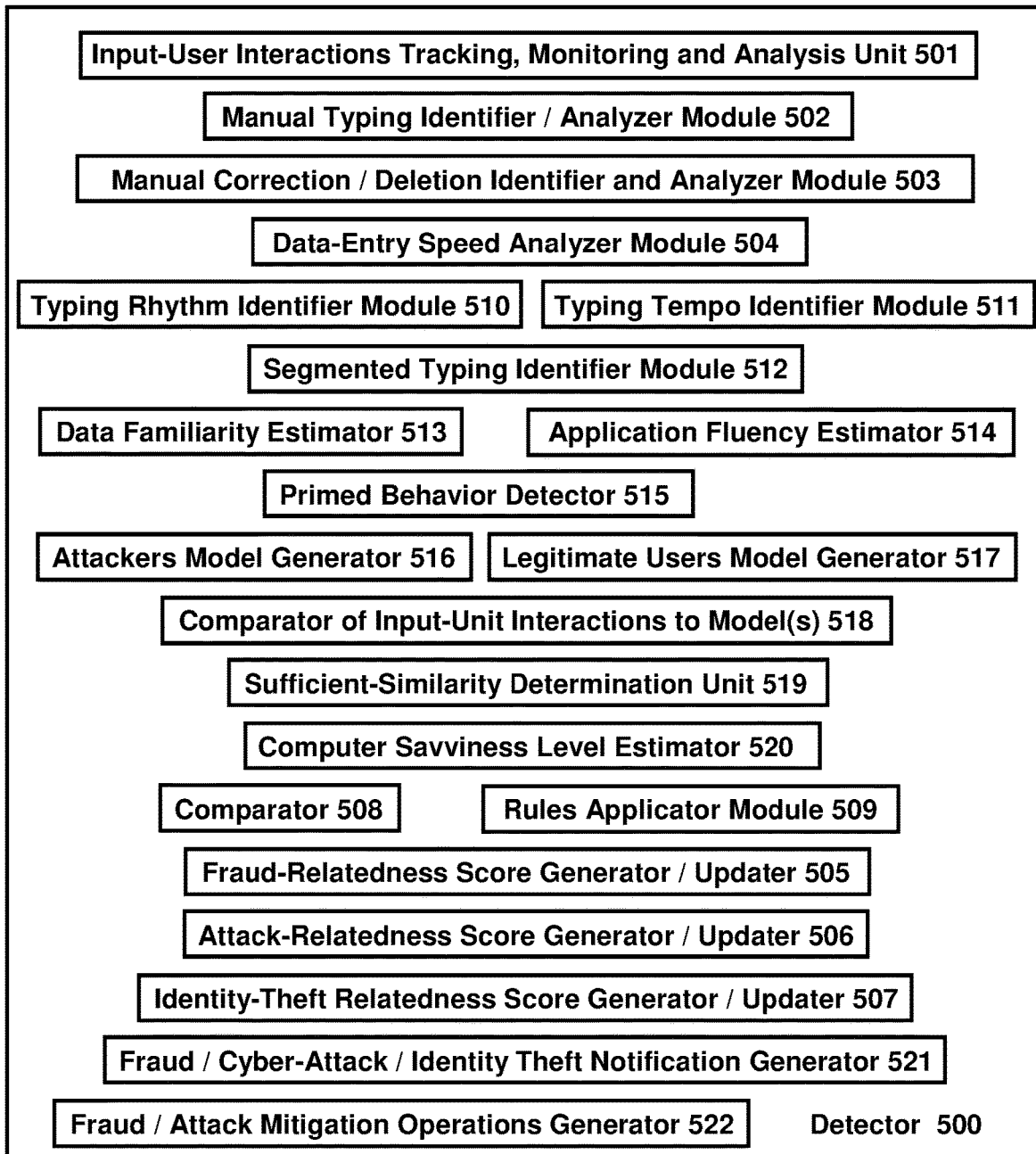
FIG. 5 is a schematic block-diagram illustration of a detector unit, in accordance with some demonstrative embodiments of the present invention.

Reference is made to FIG. 5, which is a schematic illustration of a detector unit 500, in accordance with some demonstrative embodiments of the present invention. Detector unit 500 may operate to determine whether a batch of input-unit interactions (or a single input-unit interaction) is associated with an attack or a cyber-attack or identity theft or fraud or fraudulent activity or illegitimate activity or illegal activity or criminal activity; or is performed by an attacker or cyber-attacker or impostor or identity thief, rather by a legitimate user or non-attacker.

In some embodiments, detector unit 500 may perform some or all of the operations that are described above; for example, via the following modules or units: an input-unit interactions tracking, monitoring and analysis unit 501; by a manual typing identifier/analyzer module 502; by a manual correction/deletion identifier and analyzer module 503; by a data-entry speed analyzer module 504; by a fraud-relatedness score generator/updater 505; by an attack-relatedness score generator/updater 506 (or, by a cyber-attack-relatedness score generator/updater); by an identity-theft relatedness score generator/updater 507; by a comparator 508 that compares monitored data and/or analyzed data to one or more to threshold value(s) and/or to threshold range(s) of values; by an rules applicator module 509 able to apply (e.g., serially, sequentially) rules or conditions or checks to a batch of input-unit interactions or to a particular input-unit interaction; by a typing rhythm identifier module 510; by a typing tempo identifier module 511; by a segmented typing identifier module 512; by a data familiarity estimator 513; by an application fluency estimator 514; by a primed behavior detector 515; by an Attackers Model generator 516; by a Legitimate Users Model generator 517; by a comparator of interactions to model(s) 518; by a sufficient-similarity determination unit 519 (e.g., able to determine that a batch of interactions is sufficiently similar to a particular Model since, for example, at least N out of K characteristics of that model hold true with regard to the inspected batch of interactions); a computer savviness level estimator 520; a fraud/cyber-attack/identity theft notification generator 521; a fraud/attack mitigation operations generator 522; and/or other suitable units or modules.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may comprise any possible combinations, re-arrangements, assembly, re-assembly, or other utilization of some or all of the modules or functions or components that are described herein, even if they are discussed in different locations or different chapters of the above discussion, or even if they are shown across different drawings or multiple drawings, or even if they are depicted in any drawing(s) without necessarily being connected via a line or an arrow.

While certain features of the present invention have been illustrated and described herein, many modifications, substitutions, changes, and equivalents may occur to those skilled in the art. Accordingly, the claims are intended to cover all such modifications, substitutions, changes, and equivalents.

What is claimed is:

1. A process comprising:
    (a) monitoring input-unit interactions of a user, who utilizes during a usage session one or more input units of an electronic device to fill-out data in a fillable form of a computerized service;
    (b1) if said input-unit interactions indicate that said user utilized keyboard shortcuts for data entry and for in-page navigation, then increasing an attack-relatedness score of said usage session;
    (b2) detecting a particular typing rhythm of said user in said usage session; and if said particular typing rhythm matches one or more typing rhythms that are pre-defined as typing rhythms of attackers, then increasing said attack-relatedness score of said usage session;
        wherein steps (b1) and (b2) analyze a batch of input-unit interactions which includes interactions that were performed across multiple fillable forms that were filled by said user;
        wherein steps (b1) and (b2) analyze a batch of input-unit interactions which includes interactions across multiple web-pages that belong to a single usage session of said user;
    (c) if said attack-relatedness score is greater than a particular threshold value, then: determining that said input-unit interactions are part of an attack, and initiating one or more mitigation operations.

2. The process of claim 1,
    wherein steps (b1) through (b2) further analyze a batch of input-unit interactions which includes interactions that were performed within a single fillable form.

3. The process of claim 1,
    wherein steps (b1) through (b2) analyze said batch of input-unit interactions which are interactions of a new user (I) that is not logged-in to said computerized service and (II) that is accessing said computerized service for his first time and (III) that is not associated with any pre-defined user profile derived from prior visits of said user.

4. The process of claim 1,
    wherein steps (b1) through (b2) analyze said batch of input-unit interactions which are interactions of a user that already passed a CAPTCHA challenge and already proved to the computerized service that he is a human and not a machine.

5. The process of claim 1,
    wherein steps (b1) through (b2) analyze said batch of input-unit interactions which are interactions of an already logged-in user that had successfully authenticated himself to the computerized service; wherein the process comprises determining that said user is an attacker even though he had successfully authenticated himself to the computerized service.

6. A non-transitory storage medium having stored thereon instructions that, when executed by one or more hardware processors, cause the one or more hardware processors to perform a method comprising:
    (a) monitoring input-unit interactions of a user, who utilizes during a usage session one or more input units of an electronic device to fill-out data in a fillable form of a computerized service;
    (b1) if said input-unit interactions indicate that said user utilized keyboard shortcuts for data entry and for in-page navigation, then increasing an attack-relatedness score of said usage session;
    (b2) detecting a particular typing rhythm of said user in said usage session; and if said particular typing rhythm matches one or more typing rhythms that are pre-defined as typing rhythms of attackers, then increasing said attack-relatedness score of said usage session;
        wherein steps (b1) and (b2) analyze a batch of input-unit interactions which includes interactions that were performed across multiple fillable forms that were filled by said user;
        wherein steps (b1) and (b2) analyze a batch of input-unit interactions which includes interactions across multiple web-pages that belong to a single usage session of said user;
    (c) if said attack-relatedness score is greater than a particular threshold value, then: determining that said input-unit interactions are part of an attack, and initiating one or more mitigation operations.

7. A system comprising:
    one or more hardware processors, that are configured to perform:
    (a) monitoring input-unit interactions of a user, who utilizes during a usage session one or more input units of an electronic device to fill-out data in a fillable form of a computerized service;
    (b1) if said input-unit interactions indicate that said user utilized keyboard shortcuts for data entry and for in-page navigation, then increasing an attack-relatedness score of said usage session;
    (b2) detecting a particular typing rhythm of said user in said usage session; and if said particular typing rhythm matches one or more typing rhythms that are pre-defined as typing rhythms of attackers, then increasing said attack-relatedness score of said usage session;
    wherein steps (b1) and (b2) analyze a batch of input-unit interactions which includes interactions that were performed across multiple fillable forms that were filled by said user;
    wherein steps (b1) and (b2) analyze a batch of input-unit interactions which includes interactions across multiple web-pages that belong to a single usage session of said user;

(c) if said attack-relatedness score is greater than a particular threshold value, then: determining that said input-unit interactions are part of an attack, and initiating one or more mitigation operations.

* * * * *